United States Patent [19]
George et al.

[11] Patent Number: 5,195,041
[45] Date of Patent: Mar. 16, 1993

[54] METHOD AND APPARATUS FOR IMPROVING MANUFACTURING PROCESSES

[75] Inventors: Michael L. George, Dallas; Mark A. Sherman, Richardson, both of Tex.

[73] Assignee: Institute of Business Technology, Dallas, Tex.

[21] Appl. No.: 384,292

[22] Filed: Jul. 24, 1989

[51] Int. Cl.⁵ .................. G06F 15/46; G06F 15/24
[52] U.S. Cl. .................................. 364/468; 364/156; 364/401
[58] Field of Search .............. 364/468, 478, 401, 402, 364/403, 191–194, 156, 149–151, 154

[56] References Cited

U.S. PATENT DOCUMENTS

| | | | |
|---|---|---|---|
| 3,845,286 | 10/1974 | Aronstein et al. | 364/478 X |
| 3,891,836 | 6/1975 | Lee | 364/156 |
| 4,058,711 | 11/1977 | Ondercin et al. | 364/900 |
| 4,628,434 | 12/1986 | Tashiro et al. | 364/900 |
| 4,644,480 | 2/1987 | Haruna et al. | 364/552 |
| 4,729,105 | 3/1988 | Thompson et al. | 364/478 |
| 4,796,194 | 1/1989 | Atherton | 364/478 X |
| 4,802,094 | 1/1989 | Nakamura et al. | 364/468 |
| 4,896,269 | 1/1990 | Tong | 364/468 |

FOREIGN PATENT DOCUMENTS 930320 5/1982 U.S.S.R. .

OTHER PUBLICATIONS

Kochen, "Hocus Takes the Risk Out of Planning FMS," FMS Magazine, pp. 91–93 (Apr. 1984).
Naylor, et al. "The Manufacturing Game: A Formal Approach to Manufacturing Software," IEEE Transactions on Systems, Man and Cybernetics, pp. 321–334 (May/Jun., 1986).
Szymankiewicz, Solving Business Problems by Simulation, Chapter 5 (1977).

*Primary Examiner*—Joseph Ruggiero
*Attorney, Agent, or Firm*—Herbert J. Hammond

[57] ABSTRACT

The invention determines the batch size of materials required for each process within a workstation based on a given shipment schedule, as well as the values of several other workstation variables that are determinative of workstation and factory performance. With this information, the user of the invention may schedule production for the factory or spot and prioritize workstations requiring the most improvement, and determine the character and quantity of improvement.

24 Claims, 35 Drawing Sheets

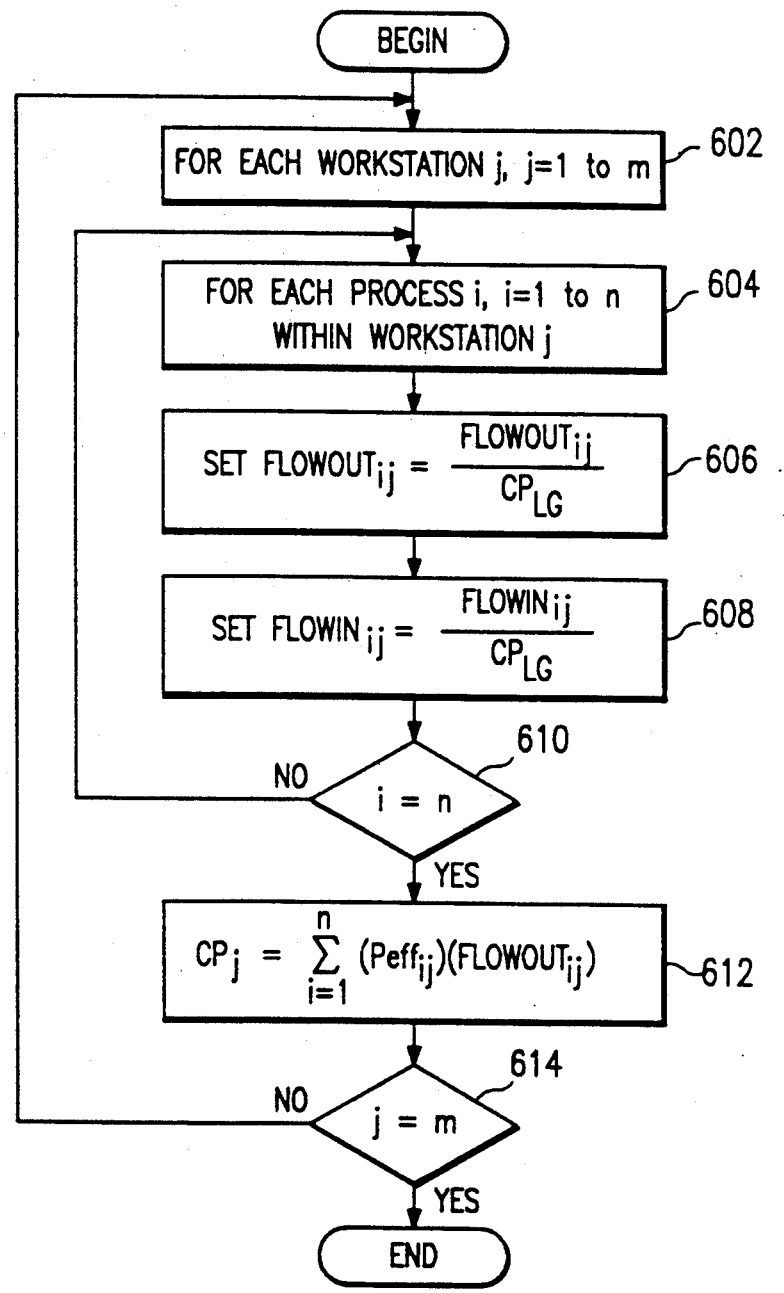

FROM FIG. 7a

716 — COMPUTE %DOWN$_j$ $$\%DOWN_j = \left[ \sum_{i=1}^{n} \left[ \{SU_{ij} - (SUSCRP_{ij} + SUREWK_{ij})(P_{ij})\} \{ \frac{MTOB_{ij}}{MTOB_{ij} + MTTB_{ij}} \} \right] + \right.$$

$$\sum_{i=1}^{n} \left[ \{(P_{ij})(B_{ij}) + (SUREWK_{ij})(RP_{ij}) + \right.$$

$$\left. \left. (RP_{ij})(B_{ij})(\%REWK_{ij})\} \{1 - (\frac{MTTB_{ij}}{MTTB_{ij} + MTOB_{ij}})(\frac{MTBF_{ij}}{MTBF_{ij} + MTTB_{ij}})\} \right] \right] (\frac{1}{CT_j})$$

718 — COMPUTE %PROC$_j$ $$\%PROC_j = \left[ \sum_{i=1}^{n} \{(P_{ij})(B_{ij}) - (P_{ij})(SUREWK_{ij}) + (RP_{ij})(SUREWK_{ij}) + \right.$$

$$\left. (RP_{ij})(B_{ij})(\%REWK_{ij}) - (P_{ij})(SUSCRP_{ij})\} \right] (\frac{1}{CT_j})$$

720 — COMPUTE %IDLE$_j$
$\%IDLE_j = 1 - \%SETUP_j - \%PROC_j - \%DOWN_j$

END

*FIG. 7b*

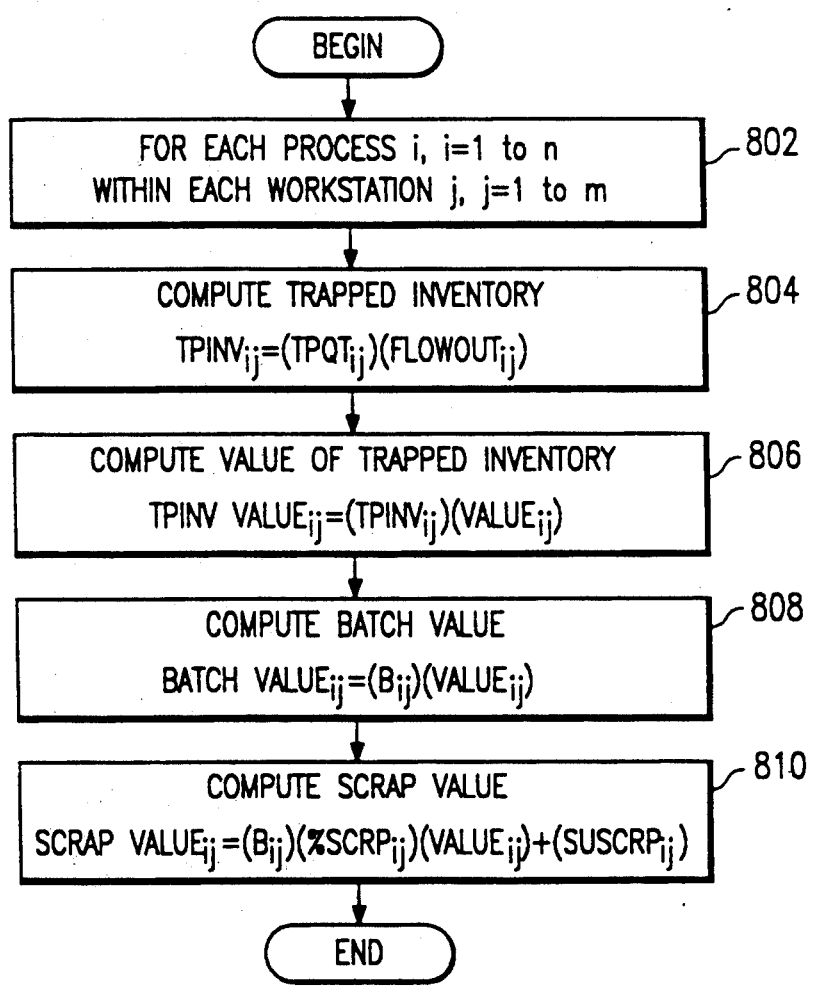

PROCESS DATA - LEFT SECTION

| PROCESS NAME | UNIT OF MEASURE | SETUP TIME | SETUP TIME UNIT OF MEASURE | PROCESS TIME | PROCESS TIME UNIT OF MEASURE | PERCENT SCRAP | PERCENT REWORK | REWORK SETUP TIME | REWORK SETUP UNIT OF MEASURE | REWORK PROCESS TIME | REWORK PROCESS UNIT OF MEASURE |
|---|---|---|---|---|---|---|---|---|---|---|---|
| STATION: ASSEMBLY | | | | | | | | | | | |
| ASSEMBLY Q | ITEM | 1.900 | HOUR | 7.2000 | MINUTE | 0.000 | 5.000 | 0.000 | HOUR | 7.2000 | MINUTE |
| ASSEMBLY P | ITEM | 1.900 | HOUR | 7.2000 | MINUTE | 0.000 | 5.000 | 0.000 | HOUR | 7.2000 | MINUTE |
| STATION: CLEAN BOARDS | | | | | | | | | | | |
| BOARD P | ITEM | 10.000 | HOUR | 5.4000 | MINUTE | 0.000 | 0.000 | 0.000 | HOUR | 5.4000 | MINUTE |
| BOARD Q | ITEM | 10.000 | HOUR | 5.4000 | MINUTE | 0.000 | 0.000 | 0.000 | HOUR | 5.4000 | MINUTE |
| STATION: CUT-LEADS | | | | | | | | | | | |
| KIT P | ITEM | 1.000 | HOUR | 8.4000 | MINUTE | 0.000 | 0.000 | 0.000 | HOUR | 0.0000 | MINUTE |
| KIT Q | ITEM | 1.000 | HOUR | 8.4000 | MINUTE | 0.000 | 0.000 | 0.000 | HOUR | 0.0000 | MINUTE |
| STATION: Q/C | | | | | | | | | | | |
| P | ITEM | 1.900 | HOUR | 7.1000 | MINUTE | 0.000 | 30.000 | 0.000 | HOUR | 7.1000 | MINUTE |
| Q | ITEM | 1.900 | HOUR | 7.1000 | MINUTE | 0.000 | 30.000 | 0.000 | HOUR | 7.1000 | MINUTE |
| STATION: SOLDR | | | | | | | | | | | |
| SOLDER P | ITEM | 1.600 | HOUR | 6.6000 | MINUTE | 0.000 | 30.000 | 0.000 | HOUR | 6.6000 | MINUTE |
| SOLDER Q | ITEM | 1.600 | HOUR | 6.6000 | MINUTE | 0.000 | 30.000 | 0.000 | HOUR | 6.6000 | MINUTE |

FIG. 11

PROCESS DATA - MIDDLE SECTION

| STARTUP SCRAP | STARTUP REWORK | MTBF | MTBF UNIT OF MEASURE | MTTR | MTTR UNIT OF MEASURE | MTTB | MTTB UNIT OF MEASURE | MTOB | TRANSPORT AND QUE TIME | TRANSPORT AND QUE UNIT OF MEASURE | UNIT COST |
|---|---|---|---|---|---|---|---|---|---|---|---|
| STATION: ASSEMBLY | | | | | | | | | | | |
| 0.000 | 0.000 | 0.000 | HOUR | 0.000 | HOUR | 0.000 | HOUR | 0.000 | 0.000 | HOUR | 210.000 |
| 0.000 | 0.000 | 0.000 | HOUR | 0.000 | HOUR | 0.000 | HOUR | 0.000 | 0.000 | HOUR | 210.000 |
| STATION: CLEAN BOARDS | | | | | | | | | | | |
| 0.000 | 0.000 | 0.000 | HOUR | 0.000 | HOUR | 0.000 | HOUR | 0.000 | 0.000 | HOUR | 65.000 |
| 0.000 | 0.000 | 0.000 | HOUR | 0.000 | HOUR | 0.000 | HOUR | 0.000 | 0.000 | HOUR | 65.000 |
| STATION: CUT-LEADS | | | | | | | | | | | |
| 0.000 | 0.000 | 0.000 | HOUR | 0.000 | HOUR | 0.000 | HOUR | 0.000 | 0.000 | HOUR | 125.000 |
| 0.000 | 0.000 | 0.000 | HOUR | 0.000 | HOUR | 0.000 | HOUR | 0.000 | 0.000 | HOUR | 125.000 |
| STATION: Q/C | | | | | | | | | | | |
| 0.000 | 0.000 | 0.000 | HOUR | 0.000 | HOUR | 0.000 | HOUR | 0.000 | 0.000 | HOUR | 255.000 |
| 0.000 | 0.000 | 0.000 | HOUR | 0.000 | HOUR | 0.000 | HOUR | 0.000 | 0.000 | HOUR | 255.000 |
| STATION: SOLDR | | | | | | | | | | | |
| 0.000 | 0.000 | 50.000 | HOUR | 5.000 | HOUR | 0.000 | HOUR | 0.000 | 10.000 | HOUR | 240.000 |
| 0.000 | 0.000 | 50.000 | HOUR | 5.000 | HOUR | 0.000 | HOUR | 0.000 | 10.000 | HOUR | 240.000 |

FIG. 12

PROCESS DATA - RIGHT SECTION

| PERCENT REWORK ELSEWHERE | MANUAL BATCH SIZE | REWORK ELSEWHERE STATION NAME | SHIPPING OUTPUT STATION NAME |
|---|---|---|---|

**\*\* STATION: ASSEMBLY**

| 0.000 | 0 | | |
| 0.000 | 0 | | |

**\*\* STATION: CLEAN BOARDS**

| 0.000 | 0 | | |
| 0.000 | 0 | | |

**\*\* STATION: CUT-LEADS**

| 0.000 | 0 | | |
| 0.000 | 0 | | |

**\*\* STATION: Q/C**

| 0.000 | 0 | | SHIP |
| 0.000 | 0 | | SHIP |

**\*\* STATION: SOLDR**

| 0.000 | 0 | | |
| 0.000 | 0 | | |

FIG. 13

INPUTS FOR PROCESS: ASSEMBLY P STATION: ASSEMBLY

| ASSEMBLY P INPUT PART NUMBER | INPUT STATION | INPUT MEASURE | INPUT QUANTITY |
|---|---|---|---|
| BOARD P | CLEAN BOARDS | ITEM | 1.000 |
| KIT P | CUT-LEADS | ITEM | 1.000 |

FIG. 14

| SHIP PART NUMBER | FROM STATION | SHIPPING MEASURE | SHIPPING QUANTITY | SHIPPING PERIOD |
|---|---|---|---|---|
| P | Q/C | ITEM | 120.00 | WEEK |
| Q | Q/C | ITEM | 120.00 | WEEK |

FIG. 15

SCHEDULE ANALYSIS BATCH SIZE LISTING
SHIPPING RATES ARE PER WEEK

BATCH SIZES

| STATION NAME | PART NUMBER | STATION SHIP RATE | BATCH SIZE | SCRAP VALUE | BATCH VALUE |
|---|---|---|---|---|---|
| CLEAN BOARDS | BOARD P | 120.0 | 131 | 0.00 | 8515.00 |
| CLEAN BOARDS | BOARD Q | 120.0 | 131 | 0.00 | 8515.00 |
| RECV | BOARD P | 120.0 | 0 | 0.00 | 0.00 |
| RECV | BOARD Q | 120.0 | 0 | 0.00 | 0.00 |
| RECV | KIT P | 120.0 | 0 | 0.00 | 0.00 |
| RECV | KIT Q | 120.0 | 0 | 0.00 | 0.00 |
| CUT-LEADS | KIT P | 120.0 | 38 | 0.00 | 4750.00 |
| CUT-LEADS | KIT Q | 120.0 | 38 | 0.00 | 4750.00 |
| ASSEMBLY | ASSEMBLY P | 120.0 | 47 | 0.00 | 9870.00 |
| ASSEMBLY | ASSEMBLY Q | 120.0 | 47 | 0.00 | 9870.00 |
| SHIP | P | 120.0 | 0 | 0.00 | 0.00 |
| SHIP | Q | 120.0 | 0 | 0.00 | 0.00 |
| Q/C | P | 120.0 | 149 | 0.00 | 37995.00 |
| Q/C | Q | 120.0 | 149 | 0.00 | 37995.00 |
| SOLDR | SOLDER P | 120.0 | 171 | 0.00 | 41040.00 |
| SOLDR | SOLDER Q | 120.0 | 171 | 0.00 | 41040.00 |

FIG. 16

SCHEDULE ANALYSIS CYCLE TIMES PER WEEK

| STATION NAME | CYCLE TIME | SETUP TIME | PROCESS TIME | DOWN TIME | IDLE TIME |
|---|---|---|---|---|---|
| ASSEMBLY | 0.391 | 24.255% | 75.600% | 0.000% | 0.145% |
| CLEAN BOARDS | 1.090 | 45.802% | 54.000% | 0.000% | 0.198% |
| CUT-LEADS | 0.316 | 15.789% | 84.000% | 0.000% | 0.211% |
| Q/C | 1.241 | 7.651% | 92.300% | 0.000% | 0.049% |
| SOLDR | 1.425 | 5.614% | 85.800% | 8.580% | 0.006% |

FIG. 18

TRAPPED INVENTORY LISTING
FACTORY: EXAMPLE SOLDER

| SCHEDULE ANALYSIS STATION NAME | PART NUMBER | STAT SHIP RATE/WEEK | PARTS TRAPPED | TRAPPED PARTS VALUE |
|---|---|---|---|---|
| CLEAN BOARDS | BOARD P | 120.00 | | |
| CLEAN BOARDS | BOARD Q | 120.00 | | |
| RECV | BOARD P | 120.00 | | |
| RECV | BOARD Q | 120.00 | | |
| RECV | KIT P | 120.00 | | |
| RECV | KIT Q | 120.00 | | |
| CUT-LEADS | KIT P | 120.00 | | |
| CUT-LEADS | KIT Q | 120.00 | | |
| ASSEMBLY | ASSEMBLY P | 120.00 | | |
| ASSEMBLY | ASSEMBLY Q | 120.00 | | |
| SHIP | P | 120.00 | | |
| SHIP | Q | 120.00 | | |
| Q/C | P | 120.00 | | |
| Q/C | Q | 120.00 | | |
| SOLDR | SOLDER P | 120.00 | 30 | $7200.00 |
| SOLDR | SOLDER Q | 120.00 | 30 | $7200.00 |

FIG. 19

MANUFACTURING CYCLE TIMES IN WEEKS

| PART NUMBER | STATION NAME | MANUFACTURING CYCLE TIME |
|---|---|---|
| P | SHIP | 4.396573333 |
| Q | SHIP | 4.396573333 |

FIG. 20

| STATION NAME | PART NUMBER | LEVEL |
|---|---|---|
| RECV | BOARD P | 0 |
| CLEAN BOARDS | BOARD P | 1 |
| ASSEMBLY | ASSEMBLY P | 2 |
| SOLDR | SOLDER P | 3 |
| Q/C | P | 4 |
| SHIP | P | 5 |

FIG 21

PROCESS DATA - LEFT SECTION

| PROCESS NAME | UNIT OF MEASURE | SETUP TIME | SETUP TIME UNIT OF MEASURE | PROCESS TIME | PROCESS TIME UNIT OF MEASURE | PERCENT SCRAP | PERCENT REWORK | REWORK SETUP TIME | REWORK SETUP UNIT OF MEASURE | REWORK PROCESS TIME | REWORK PROCESS UNIT OF MEASURE |
|---|---|---|---|---|---|---|---|---|---|---|---|
| STATION: ASSEMBLY | | | | | | | | | | | |
| ASSEMBLY Q | ITEM | 1.900 | HOUR | 7.2000 | MINUTE | 0.000 | 5.000 | 0.000 | HOUR | 7.2000 | MINUTE |
| ASSEMBLY P | ITEM | 1.900 | HOUR | 7.2000 | MINUTE | 0.000 | 5.000 | 0.000 | HOUR | 7.2000 | MINUTE |
| STATION: CLEAN BOARDS | | | | | | | | | | | |
| BOARD P | ITEM | 10.000 | HOUR | 5.4000 | MINUTE | 0.000 | 0.000 | 0.000 | HOUR | 5.4000 | MINUTE |
| BOARD Q | ITEM | 10.000 | HOUR | 5.4000 | MINUTE | 0.000 | 0.000 | 0.000 | HOUR | 5.4000 | MINUTE |
| STATION: CUT-LEADS | | | | | | | | | | | |
| KIT P | ITEM | 1.000 | HOUR | 8.4000 | MINUTE | 0.000 | 0.000 | 0.000 | HOUR | 0.0000 | MINUTE |
| KIT Q | ITEM | 1.000 | HOUR | 8.4000 | MINUTE | 0.000 | 0.000 | 0.000 | HOUR | 0.0000 | MINUTE |
| STATION: Q/C | | | | | | | | | | | |
| P | ITEM | 1.900 | HOUR | 7.1000 | MINUTE | 0.000 | 27.000 | 0.000 | HOUR | 7.1000 | MINUTE |
| Q | ITEM | 1.900 | HOUR | 7.1000 | MINUTE | 0.000 | 27.000 | 0.000 | HOUR | 7.1000 | MINUTE |
| STATION: SOLDR | | | | | | | | | | | |
| SOLDER P | ITEM | 1.600 | HOUR | 6.6000 | MINUTE | 0.000 | 27.000 | 0.000 | HOUR | 6.6000 | MINUTE |
| SOLDER Q | ITEM | 1.600 | HOUR | 6.6000 | MINUTE | 0.000 | 27.000 | 0.000 | HOUR | 6.6000 | MINUTE |

FIG. 23

PROCESS DATA - MIDDLE SECTION

| STARTUP SCRAP | STARTUP REWORK | MTBF | MTBF UNIT OF MEASURE | MTTR | MTTR UNIT OF MEASURE | MTTB | MTTB UNIT OF MEASURE | MTOB | TRANSPORT AND QUE TIME | TRANSPORT AND QUE UNIT OF MEASURE | UNIT COST |
|---|---|---|---|---|---|---|---|---|---|---|---|
| STATION: ASSEMBLY | | | | | | | | | | | |
| 0.000 | 0.000 | 0.000 | HOUR | 0.000 | HOUR | 0.000 | HOUR | 0.000 | 0.000 | HOUR | 210.000 |
| 0.000 | 0.000 | 0.000 | HOUR | 0.000 | HOUR | 0.000 | HOUR | 0.000 | 0.000 | HOUR | 210.000 |
| STATION: CLEAN BOARDS | | | | | | | | | | | |
| 0.000 | 0.000 | 0.000 | HOUR | 0.000 | HOUR | 0.000 | HOUR | 0.000 | 0.000 | HOUR | 65.000 |
| 0.000 | 0.000 | 0.000 | HOUR | 0.000 | HOUR | 0.000 | HOUR | 0.000 | 0.000 | HOUR | 65.000 |
| STATION: CUT-LEADS | | | | | | | | | | | |
| 0.000 | 0.000 | 0.000 | HOUR | 0.000 | HOUR | 0.000 | HOUR | 0.000 | 0.000 | HOUR | 125.000 |
| 0.000 | 0.000 | 0.000 | HOUR | 0.000 | HOUR | 0.000 | HOUR | 0.000 | 0.000 | HOUR | 125.000 |
| STATION: Q/C | | | | | | | | | | | |
| 0.000 | 0.000 | 0.000 | HOUR | 0.000 | HOUR | 0.000 | HOUR | 0.000 | 0.000 | HOUR | 255.000 |
| 0.000 | 0.000 | 0.000 | HOUR | 0.000 | HOUR | 0.000 | HOUR | 0.000 | 0.000 | HOUR | 255.000 |
| STATION: SOLDR | | | | | | | | | | | |
| 0.000 | 0.000 | 50.000 | HOUR | 5.000 | HOUR | 0.000 | HOUR | 0.000 | 10.000 | HOUR | 240.000 |
| 0.000 | 0.000 | 50.000 | HOUR | 5.000 | HOUR | 0.000 | HOUR | 0.000 | 10.000 | HOUR | 240.000 |

FIG. 24

PROCESS DATA - RIGHT SECTION

| PERCENT REWORK ELSEWHERE | MANUAL BATCH SIZE | REWORK ELSEWHERE STATION NAME | SHIPPING OUTPUT STATION NAME |
|---|---|---|---|
| ** STATION: ASSEMBLY | | | |
| 0.000 | 0 | | |
| 0.000 | 0 | | |
| ** STATION: CLEAN BOARDS | | | |
| 0.000 | 0 | | |
| 0.000 | 0 | | |
| ** STATION: CUT-LEADS | | | |
| 0.000 | 0 | | |
| 0.000 | 0 | | |
| ** STATION: Q/C | | | |
| 0.000 | 0 | | SHIP |
| 0.000 | 0 | | SHIP |
| ** STATION: SOLDR | | | |
| 0.000 | 0 | | |
| 0.000 | 0 | | |

FIG. 25

| ASSEMBLY P INPUT PART NUMBER | INPUT STATION | INPUT MEASURE | INPUT QUANTITY |
|---|---|---|---|
| BOARD P | CLEAN BOARDS | ITEM | 1.000 |
| KIT P | CUT-LEADS | ITEM | 1.000 |

FIG. 26

| SHIP PART NUMBER | FROM STATION | SHIPPING MEASURE | SHIPPING QUANTITY | SHIPPING PERIOD |
|---|---|---|---|---|
| P | Q/C | ITEM | 120.00 | WEEK |
| Q | Q/C | ITEM | 120.00 | WEEK |

FIG. 27

SCHEDULE ANALYSIS BATCH SIZE LISTING
SHIPPING RATES ARE PER WEEK

BATCH SIZES

| STATION NAME | PART NUMBER | STATION SHIP RATE | BATCH SIZE | SCRAP VALUE | BATCH VALUE |
|---|---|---|---|---|---|
| CLEAN BOARDS | BOARD P | 120.0 | 131 | 0.00 | 8515.00 |
| CLEAN BOARDS | BOARD Q | 120.0 | 131 | 0.00 | 8515.00 |
| RECV | BOARD P | 120.0 | 0 | 0.00 | 0.00 |
| RECV | BOARD Q | 120.0 | 0 | 0.00 | 0.00 |
| RECV | KIT P | 120.0 | 0 | 0.00 | 0.00 |
| RECV | KIT Q | 120.0 | 0 | 0.00 | 0.00 |
| CUT-LEADS | KIT P | 120.0 | 38 | 0.00 | 4750.00 |
| CUT-LEADS | KIT Q | 120.0 | 38 | 0.00 | 4750.00 |
| ASSEMBLY | ASSEMBLY P | 120.0 | 47 | 0.00 | 9870.00 |
| ASSEMBLY | ASSEMBLY Q | 120.0 | 47 | 0.00 | 9870.00 |
| SHIP | P | 120.0 | 0 | 0.00 | 0.00 |
| SHIP | Q | 120.0 | 0 | 0.00 | 0.00 |
| SOLDR | SOLDER P | 120.0 | 124 | 0.00 | 29760.00 |
| SOLDR | SOLDER Q | 120.0 | 124 | 0.00 | 29760.00 |
| Q/C | P | 120.0 | 116 | 0.00 | 29580.00 |
| Q/C | Q | 120.0 | 116 | 0.00 | 29580.00 |

FIG. 28

SCHEDULE ANALYSIS CYCLE TIMES PER WEEK

| STATION NAME | CYCLE TIME | SETUP TIME | PROCESS TIME | DOWN TIME | IDLE TIME |
| --- | --- | --- | --- | --- | --- |
| ASSEMBLY | 0.391 | 24.255% | 75.600% | 0.000% | 0.145% |
| CLEAN BOARDS | 1.090 | 45.802% | 54.000% | 0.000% | 0.198% |
| CUT-LEADS | 0.316 | 15.789% | 84.000% | 0.000% | 0.211% |
| Q/C | 0.967 | 9.828% | 90.170% | 0.000% | 0.002% |
| SOLDR | 1.033 | 7.742% | 83.820% | 8.382% | 0.056% |

FIG. 30

TRAPPED INVENTORY LISTING
FACTORY: EXAMPLE SOLDER

| SCHEDULE ANALYSIS STATION NAME | PART NUMBER | STAT SHIP RATE/WEEK | PARTS TRAPPED | TRAPPED PARTS VALUE |
|---|---|---|---|---|
| CLEAN BOARDS | BOARD P | 120.00 | | |
| CLEAN BOARDS | BOARD Q | 120.00 | | |
| RECV | BOARD P | 120.00 | | |
| RECV | BOARD Q | 120.00 | | |
| RECV | KIT P | 120.00 | | |
| RECV | KIT Q | 120.00 | | |
| CUT-LEADS | KIT P | 120.00 | | |
| CUT-LEADS | KIT Q | 120.00 | | |
| ASSEMBLY | ASSEMBLY P | 120.00 | | |
| ASSEMBLY | ASSEMBLY Q | 120.00 | | |
| SHIP | P | 120.00 | | |
| SHIP | Q | 120.00 | | |
| SOLDR | SOLDER P | 120.00 | 30 | $7200.00 |
| SOLDR | SOLDER Q | 120.00 | 30 | $7200.00 |
| Q/C | P | 120.00 | | |
| Q/C | Q | 120.00 | | |

FIG. 31

MANUFACTURING CYCLE TIMES IN WEEKS

| PART NUMBER | STATION NAME | MANUFACTURING CYCLE TIME |
|---|---|---|
| P | SHIP | 3.729997333 |
| Q | SHIP | 3.729997333 |

FIG. 32

| STATION NAME | PART NUMBER | LEVEL |
| --- | --- | --- |
| RECV | BOARD P | 0 |
| CLEAN BOARDS | BOARD P | 1 |
| ASSEMBLY | ASSEMBLY P | 2 |
| SOLDR | SOLDER P | 3 |
| Q/C | P | 4 |
| SHIP | P | 5 |

FACTORY: EXAMPLE SOLDER   MENU: MANUFACTURING PATH LIST

FIG. 33

METHOD AND APPARATUS FOR IMPROVING MANUFACTURING PROCESSES

FIELD OF THE INVENTION

This invention relates generally to modeling systems for manufacturing processes, and more particularly to a method and apparatus for analyzing manufacturing processes in order to schedule production and improve the manufacturing performance of a factory.

BACKGROUND OF THE INVENTION

In the global economy, domestic manufacturing enterprises are facing formidable competition from foreign companies who offer high quality goods at low prices. Domestic enterprises cannot remain competitive with foreign or even domestic companies by manufacturing goods in accordance with conventional practices. The intense present day competition necessitates rapid and, indeed, continual improvement of the methods and facilities for manufacturing goods.

There is a bewildering array of technological innovations available to enable a company to improve its manufacturing processes. An enterprise may choose to automate its factory with robots, MPR and/or computer integrated manufacturing. It may often reduce direct labor costs and improve employee performance through motivational techniques. Improvements involving automation, however, are likely to be very expensive and to demonstrably affect the continued viability of the enterprise in a competitive market. Thereafter, accurate analysis of manufacturing processes and investment in improving existing processes is critical to performance. Difficult questions have to be asked and answered about what is to be improved, how to improve it, and in what order to make the improvements for the optimal cost-efficient performance.

Unfortunately, decision makers often rely more on intuition than on an accurate analysis. Reliance on intuition, more often than not, proves to be misleading. Intuition is often misguided by outdated beliefs or misunderstandings of the principles of manufacturing. Very often intuition does not lead to lower costs or higher quality. Indeed, these older manufacturing Principles may have the reverse effect. To cite one example, most American manufacturers use a batch production method in which batch sizes for a manufacturing process are increased so as to reduce the direct manufacturing cost per unit. Contrary to intuition, however, running larger batch sizes can actually increase indirect manufacturing costs and conceal waste functions that are likely to impede efforts to lower manufacturing costs and improve the product quality. Waste functions may include, for example, excessively long set-up times for each manufacturing process, the amount of scrap produced by a process, the amount of rework that is done, the effect of machine and human down time. These waste functions necessitate, for a given volume of material, more labor, more inventory, more capital equipment, more time, and more physical space. Thus, overhead, plant and capital costs are increased with batch manufacturing. Furthermore, increased batch sizes inevitably affect quality negatively. Finally, running large batch sizes makes it more costly to build custom products that many markets demand, decreases responsiveness to changing market conditions, and slows the introduction of new products.

The executive tasked with improving the manufacturing processes of an enterprise must therefore ignore intuition and seek guidance for improving the manufacturing process with sound manufacturing principles.

One approach that overcomes misguided intuition is the "Just In Time" or "Toyota" method. The basic tenant of "Just In Time" is that an existing shipment or factory output schedule should be met with ever smaller batch sizes of the raw materials and intermediate products that make up the final product. With "Just In Time", batch sizes are made increasingly smaller until a particular workstation fails. Appropriate adjustments are then made in the manufacturing process. The "Just In Time" method replaces misguided intuition by basing improvements on reduction of batch sizes.

Although superior to intuition, "Just In Time" has its drawbacks. Improvements to a factory using the "Just In Time" method are made slowly and can result in temporary but sometimes lengthy halts in production. Since batch size reductions are necessary to gather information on which processes in the factory require the most improvement, the method is only suitable for the manufacture of products in large lots, such as automobiles. Many enterprises lack the time, money or volume of production to make them suitable candidates for improvement by the "Just In Time" method.

A tool with which to analyze a manufacturing process before making the changes to the processes is therefore required for those not able to use "Just In Time". Indeed, even those using "Just In Time" will benefit from this sort of tool.

One type of prior art tool is one that dynamically models the real-time operation of a factory. Modeling languages such as SLAM and GPSS have been successfully used to model manufacturing processes. Successful use of these languages, however, requires expert computer programming skills. Normally, those tasked with improving the manufacturing process are manufacturing executives and engineers, not expert programmers, and lack the skills necessary to apply the modeling language techniques to their particular processes.

Moreover, dynamic simulation tools suffer from other significant shortcomings. The accuracy of the program's simulation is limited by the modeler's insight and understanding of the manufacturing process. These real-time models merely simulate the movement of material through the various manufacturing processes by monitoring the size of the queues of material at various points in the factory. Apart from showing that a process in the factory has either too much material or not enough material to process, the size of the queues of material waiting to be processed do not provide information useful in determining what component of the manufacturing process should be improved or how to improve it. Multiple hypothetical runs must be made to see what effect a given set of parameter changes will have on performance. Information about what changes in the process will yield the most significant improvement therefore must be discovered by trial and error. With a very large factory, in which multiple processes are running simultaneously, the use of such programs to simulate real-time production is so difficult that it is almost impossible to predict the effects of changes in a manufacturing processes.

To improve the efficiency of manufacturing processes in a factory, an analytical tool simple and easy enough to be used by non-expert programmers is needed for accurately modelling the manufacturing process, identifying the steps or processes which are candidates for improvement, prioritizing the candidates for improvement, and determining the character and quantity of improvement.

SUMMARY OF THE INVENTION

This invention is a tool to be used for planning improvements to a manufacturing facility. The apparatus of the preferred embodiment is a specially programmed digital computer. The method of the invention is a series of steps to be implemented, in the preferred embodiment, with a digital computer.

Unlike most other prior art models of manufacturing processes, this invention does not dynamically simulate the running of the manufacturing processes. Instead, it breaks down the factory into flows of material going into and out of each workstation in the factory for each process taking place within a workstation. Each process has associated with it an effective set-up time and an effective processing time per unit of material. The total time that it takes a workstation to set-up each process and manufacture a predetermined batch of materials for every process at that workstation is called workstation cycle time. With the batch size for each process and cycle time for each workstation, as well as other values determined by the invention, production may be scheduled and necessary improvements to the factory determined.

Minimum flow rates required to meet given outputs of the factory are first determined by the invention. With the effective set-up times for each process and processing times per unit of material, batch sizes for each process and the workstation cycle times necessary to meet the required flow rates can be determined. The invention also determines the effective processing times and the effective set-up times. The effective set-up times and the effective processing times are affected by scrap and rework generated by the process and start-up scrap and start-up rework and other factors which cause the workstation to be down. The invention is capable of modelling a factory having at least one and as many as hundreds of workstations and directly determines batch sizes and workstation cycle times, as well as other values of variables indicative of the performance of the manufacturing processes within the factory. These values then serve to guide the decision maker on improving the manufacturing processes for lower cost and higher quality manufacturing.

The invention requires information concerning all of the workstations in the factory, the processes within each workstation, the inputs and outputs of each Process, the shipping rates of the manufactured units, set-up time for each process and processing time per unit of material for each process. The invention may also be provided with the following values, although they are not necessary for the model to run: the percentage of scrap generated by each process; the percentage of rework generated by each process; the rework set-up time; the rework processing time per part or unit of measure; start-up scrap of each process; start-up rework of each process; the mean time between failures of each process; the mean time between repairs of each process; the mean time between breaks for human workers for each process; the mean time on break for human workers for each process; the transport and queue time to the next process; the dollar value of the parts or materials generated by each process; the percent of rework done elsewhere for the parts or units generated by each process; and the batch size of parts or units built for each process.

The invention analyzes the manufacturing processes in two ways. First, the schedule analysis determines from all the data provided to it the minimum allowable batch sizes for each process, and other values relating to workstation performance, to be used to meet the shipping rates provided by the user. Second, capacity analysis determines from the data provided to it the minimum allowable batch sizes and the other related values based on the factory running at peak capacity and building products in the same ratios that were entered as shipping rates. The capacity analysis automatically adjusts the material flows in the factory to run at peak capacity and shows the user which workstation(s) are limiting the capacity of the factory. At the conclusion of each analysis, the user is provided by the invention with values which can be used to prioritize the workstations and the processes in need of the most improvement, to determine how much they need to be improved, and to determine what types of improvements will result in lower manufacturing costs and higher quality products. This data includes batch sizes of materials for each process, the cycle times for each workstation, percentages of time spent setting up, processing, down, and idle for each workstation the amount of trapped inventory at each workstation, the value of the scrap at each workstation, the value of each batch at each workstation, the value of the trapped inventory at each workstation, and the manufacturing cycle time through the worst case path for every product shipped.

Thus, the invention serves as a tool to be used for improving the performance of a manufacturing facility. Further, it is easily applicable to any factory having from one to hundreds of workstations by any user with a minimal amount of training. Because of its elegantly simple solution to a very complex problem, the invention is capable of being practiced even with a personal computer.

BRIEF DESCRIPTION OF THE DRAWINGS

FIG. 6 is a flow diagram of another subroutine in the capacity analysis for redetermining material flow rates and capacity variables.

FIGS. 7a and 7b constitute a flow diagram for the subroutine that determines the minimum batch size required for each process, the workstation cycle time for each workstation, and the values for other variables demonstrating workstation performance.

FIG. 8 is a flow diagram for the subroutine that determines for each process at each workstation the amount of trapped inventory, the value of the batches of material, the value of the trapped inventory trapped at each workstation, and the value of the scrap generated by each process.

FIGS. 11 through 13 show examples of data provided by the user to the invention of the model factory.

FIG. 14 is an example of a bill of material for a process within a workstation of the model factory.

FIG. 15 is an example of the shipping rates entered by the user for each product shipped by the model factory.

FIG. 16 is an example showing the batch sizes, batch values and scrap values determined by the invention for each process in the model factory.

FIG. 18 is an example of the cycle times and percentage breakdown of the time spent at each station in the model factory as determined by the invention.

FIG. 19 is an example of the amount of each part trapped at each station and the corresponding part values as determined by the invention.

FIG. 20 is an example of the manufacturing cycle times as determined by the invention for each part shipped.

FIG. 21 is the worst-case path through the factory that is used by the invention to determine the manufacturing cycle time for one of the parts that is shipped.

FIGS. 23 through 25 show examples of data provided by the user to the invention of the improved model factory.

FIG. 26 is an example of a bill of material for a process within a workstation of the improved model factory.

FIG. 27 is an example of the shipping rates entered by the user for each product shipped by the improved model factory.

FIG. 28 is an example showing the batch sizes, batch values and scrap values determined by the invention for each process in the improved model factory.

FIG. 30 is an example of the cycle times and percentage breakdown of the time spent at each station in the improved model factory as determined by the invention.

FIG. 31 is an example of the amount of each part trapped at each station and the corresponding part value in the improved model factory as determined by the invention.

FIG. 32 is an example of the manufacturing cycle times as determined by the invention for each part shipped in the improved model factory.

FIG. 33 is the worst-case path through the improved model factory that is used by the invention to determine the manufacturing cycle time for one of the parts that is shipped.

DETAILED DESCRIPTION OF THE DRAWINGS

In the preferred embodiment, the apparatus of this invention is a specially programmed data processing system. The steps of the method of this invention are performable by a data processing system.

Figure 1:
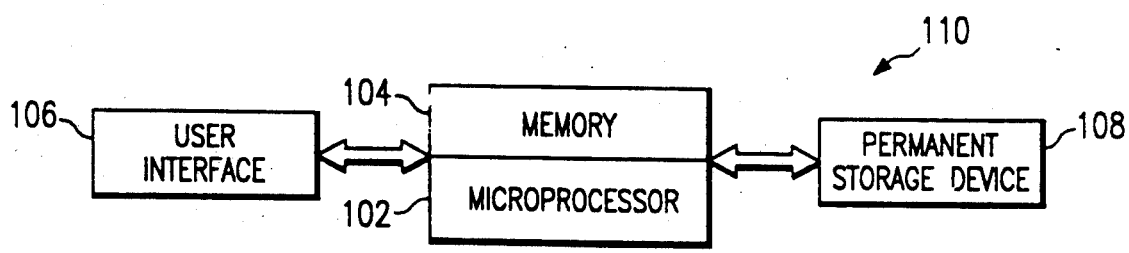
FIG. 1 is a block diagram of a digital computer.

Referring to FIG. 1, the hardware of the preferred embodiment is a data processing system having a microprocessor 102 and a random access memory device (RAM) 104 for storing data and software.

A user interface device 106 is connected to the microprocessor 102 and memory device 104 through which the user may enter and receive data. In the preferred embodiment, the user interface device 106 is a video display monitor with an alphanumeric keyboard. The interface device may also include a printer. A data storage device 108 for storing software, factory models, and other information for implementing the invention is likewise connected to microprocessor 102 and memory 104. In preferred embodiment permanent data storage device 108 is a hard disk drive or other comparable device such as those employing magnetic or optical media. A floppy disk drive should also be available to initially install the software.

Data processing system 110 can be any digital processor having adequate processing speed and memory. A personal computer having a microprocessor operating at 10 to 33 MHz and a storage capacity of 40 Megabytes are exemplary. Many commercially available "Laptop" computers are likewise suitable.

A description of the theoretical model and of its nomenclature which forms the basis for the present invention will be helpful to an understanding of the invention. A factory has one or more workstations, each of which carries out one or more processes. The factory also includes receiving, shipping and possibly quality control stations. Every process has at least one input and output. Material to be processed originates at a receiving station. An input for a process arrives from either a receiving station, another workstation or a quality control station. The outputs of each process may be routed to another workstation, a quality control station or shipping station. The final factory outputs are all sent to the shipping station(s), where they are shipped at known shipping rates for the schedule analysis and at calculated shipping rates for the capacity analysis.

Each process at a workstation processes a particular type of material. The average time that it takes for the process to process one unit of material/is defined as the processing time per unit of material (P). The average processing time is generally taken while the worker is present, the machine is running and when rework is not required. A unit can be a discrete part or a unit of measure of the material. When a workstation has more than one process, the end of one process may require the next process to be set up. The set up time (SU) for the second process is the time between the last good unit produced by the first process and the first good unit produced by the second process less the processing time for one unit of the second part. Set up time is generally taken to be the average time to set up the process when the workers are present and the equipment is operational. Set-up produces only bad units or defective material if material is produced during set-up. Set-up material may be scrapped, the amount of scrap being referred to as set-up scrap (SUSCRP). It may also be reworked into good material, the number of units reworked being referred to as set-up rework (SUREWK). Each process may also produce a certain amount of defective material after set-up and during processing. Some of this material may be reworked and made into good material. The percentage of material to be reworked from each process is known as percent rework (%REWK). The rework may be performed at that workstation or elsewhere. The percent of parts reworked elsewhere is known as percent rework elsewhere (%REWKEL). Performing rework may require additional set-up time, known as rework set-up time (RSU). Rework can be also done at a different processing rate. The rework processing time (RP) equals the average processing time to rework a unit of material while the worker is present and the machine is operational. Those parts which were too defective to be reworked are scrapped. The percentage of parts for a given Process that are scrapped is known as percent scrap (%SCRP).

Workstations usually do not operate continually. When the workstation has material to process but it is not operating, it is due to either machine failure or human break time. The average time between machine failures is called mean time between failures (MTBF). The average time it takes to repair a workstation experiencing a machine failure is the mean time to repair (MTTR). Similarly, when a workstation whose operation depends on a human being cannot process units of material because of the absence of the human being, there is human down time. The human's absence is usually due to a break taken at specified intervals for a certain amount of time or for other functions that the operator must do that are not directly related to manufacturing. The average time between breaks is called mean time to break (MTTB), and the average time on break is called mean time on break (MTOB).

Once material has been processed by a workstation and is ready to be sent to a subsequent station, it must be transported. The material often, however, must wait to be transported to the next process. This is known as queue time. Transport and queue time are collected into a single variable for each process called transport and queue time (TPQT).

A list of the above variables and their definitions is provided in Appendix I.

Figure 2A:
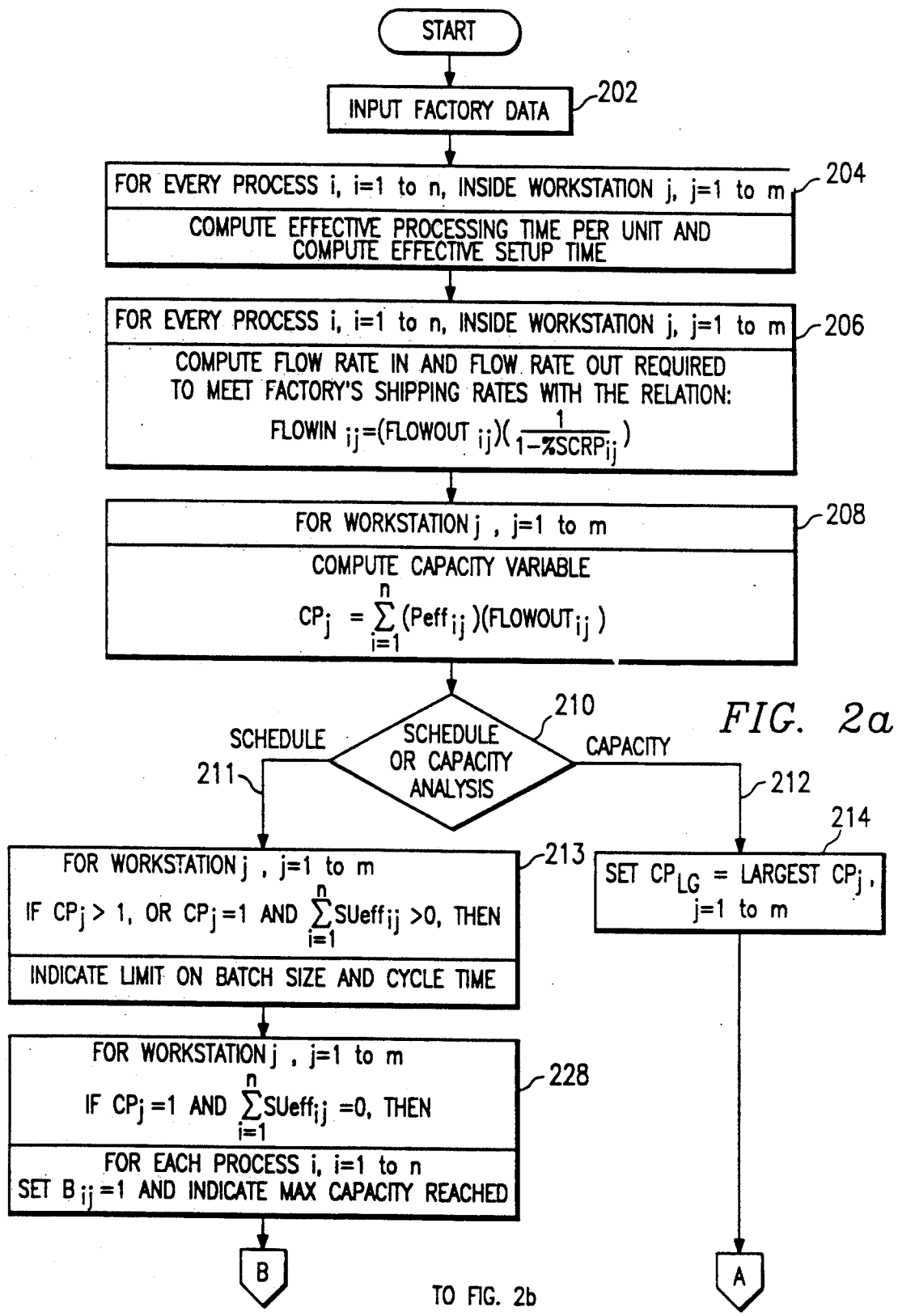
FIGS. 2a, 2b and 2c constitute a flow diagram of the steps of the present invention as carried out on a digital computer.
Figure 2B:
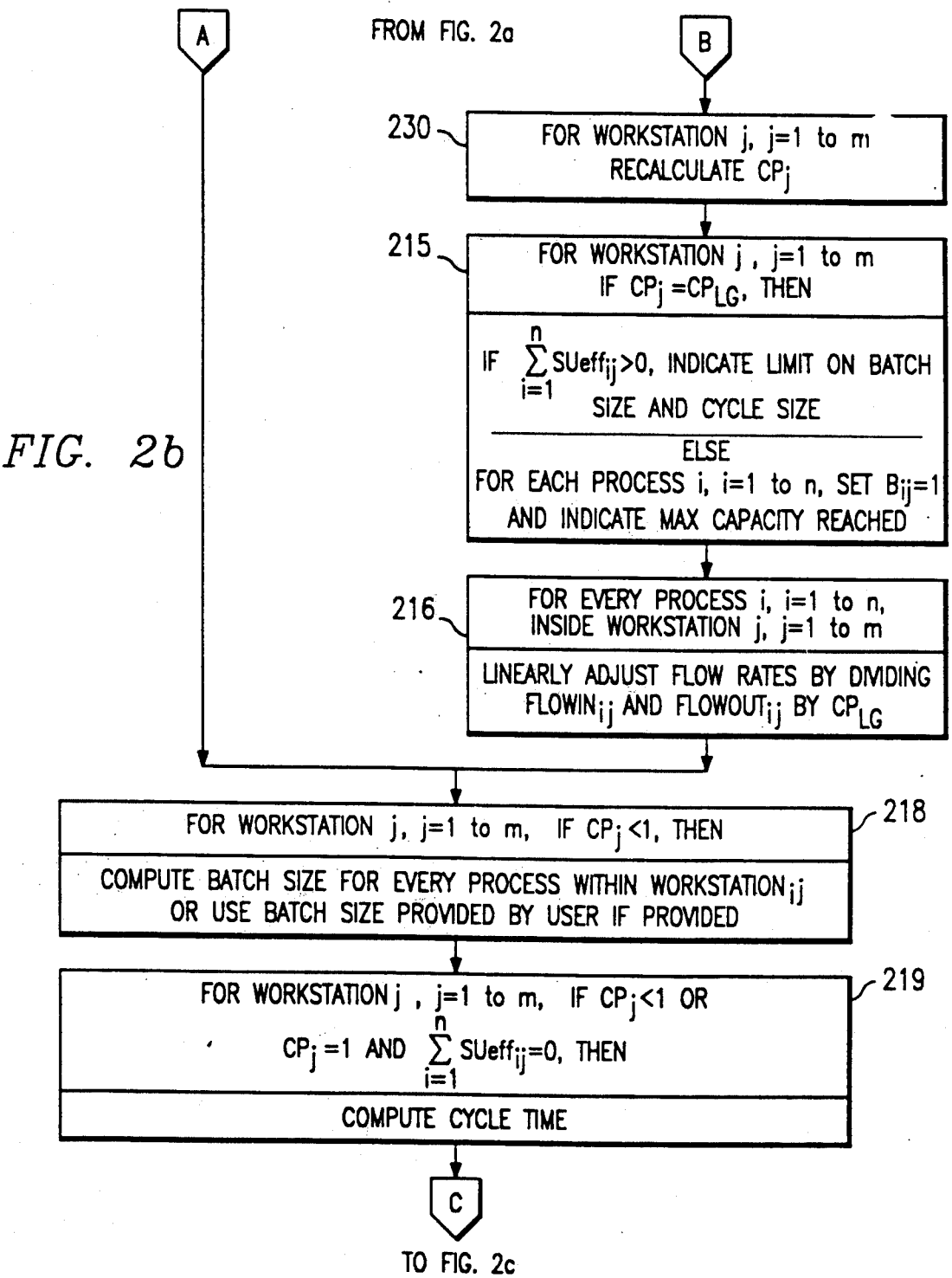
Figure 2C:
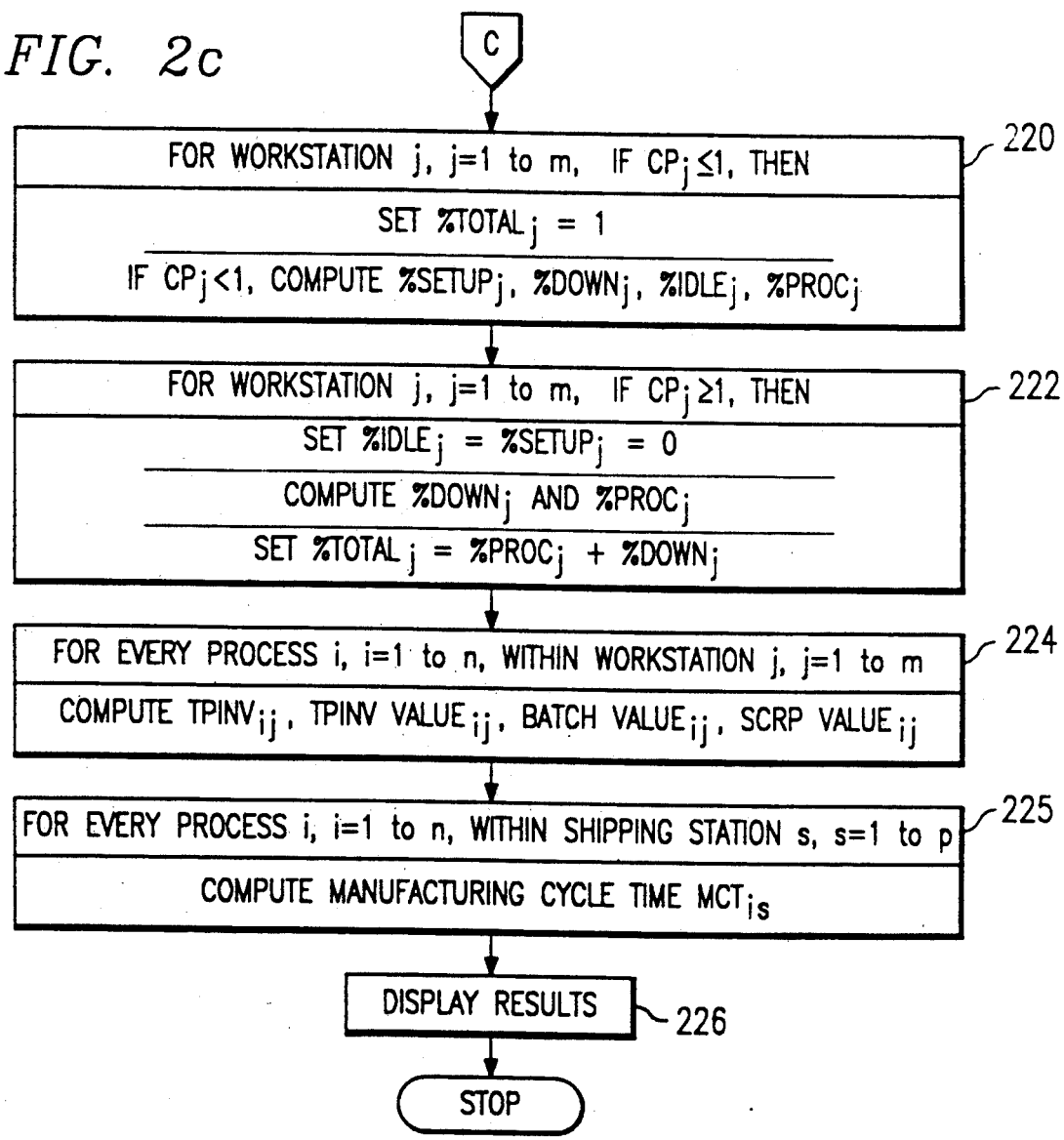

With this model of the factory, the invention quickly provides to the user values of a number of variables with which the user may improve the performance of the factory. FIG. 2, a flow diagram of the subroutines comprising the application software of the present invention, shows the general method with which the present invention analyzes the above factory model. Details of the method are shown in the flow diagrams of selected subroutines shown in FIGS. 3 to 9.

Referring to FIG. 2, the invention begins with block 202. The data processing system 110 is provided by the user with factory data through user interface 106. The data is stored in memory device 104 and permanent storage device 108. Factory data includes information on all workstations, receiving stations, quality control stations, shipping stations, and all processes for each workstation and quality control station. Inputs and outputs for each process must also be provided. This information is entered by the user via a keyboard on an interactive basis. Of course other means may be used to provide the information to the digital processor such as magnetic tape, magnetic diskettes, magnetic hard disks, optical storage devices, or any other digital storage media. Indeed, once a factory model is created from this data, it may be stored in and later retrieved from the permanent storage device.

Data which must be provided to the digital processor are the processing time per unit of material and the set-up time for each process. Values for the following variables may, but do not necessarily have to be entered:

Percent scrap (%SCRP)
Percent rework (%REWK)
Rework set-up time (RSU)
Rework processing time (RP)
Start-up scrap (SUSCRP)
Start-up rework (SUREWK)
Mean time between failures (MTBF)
Mean time to repair (MTTR)
Mean time to break (MTTB)
Mean time on break (MTOB)
Transport and queue time to next process (TPQT)
Dollar value of material (VALUE)
Percent rework elsewhere (%REWKEL)
Manual batch size (MANBAT)

Two additional variables not previously defined are the dollar value of material (VALUE), being the dollar value of each part or unit of material passing through a process, and the manual batch size of material (MANBAT) for a process The latter provides the opportunity for the user to enter batch sizes of the materials actually to be used for each process instead of determining them from shipping rates.

The next step, shown in block 204, is performed for every process at each workstation of the factory, and executes a subroutine to compute the effective processing time per part (Peff) and the effective set-up time (SUeff) per process for every process. The following example and diagram is helpful to understanding Peff and SUeff. For a workstation performing two processes, A and B, its work cycle may be diagramed along a time axis with "1" representing a unit of material processed and "—" representing set up time:

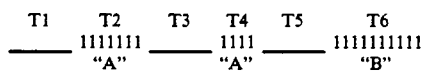

The time required of a process to build one unit of material is equal to P. Peff for process "A", on the other hand, is the time period T2 divided by number of good units of "A" built. If some of "A" that is built is defective and must be scraped or reworked, the number of good "A" falls and Peff grows longer. Similarly, if the machine breaks during the period T2 or human beings necessary to operate the workstation go on break, T2 is longer and Peff increases. Period T3 represents the time to set up to rework defective "A's". Period T4 represents the time to rework defective material produced by the processing of "A" into good material. The time to rework a unit of material is RP. Since reprocessing produces good material it is also included with the processing time. For each unit of "A" that is reworked, RP must be added to the total processing time. The effect of rework on Peff must be taken into account when determining Peff.

Until a good unit of "A" is produced, the workstation is said to be setting up. Set up includes by definition, therefore, the time to produce the defective parts that may be incidental to setting up a process. Similarly, by definition, set up time is only affected by machine down time when the machine is producing either start-up scrap or start-up rework since the machine is not running during the rest of set-up. Human downtime, however, directly affects set up time and processing time; the absence of a human being required to set up or process parts lengthens set up time or processing time. If to rework material from process "A" requires additional set up, the rework set up time (RSU) period T3 shown in the above diagram for process "A" will effect SUeff for process "A". Details of the computation of Peff and SUeff are described in connection with FIG. 3.

The next step represented by block 206 of FIG. 2, executes a subroutine in the software for determining the flow rate of material into and out of each process at each workstation that is necessary to meet the given shipping rates. ("flow" refers to the movement of both liquid and solid material.) By the principle of conservation of matter, the amount of material supplied to a process must equal the amount of material out plus scrap. The flow rate into a process (FLOWIN) at a workstation is related, therefore, to the flow rate out (FLOWOUT) by the following equation:

$$FLOWIN_{ij} = [FLOWOUT_{ij}][1/(1/-\%SCRP_{ij})]. \quad (1)$$

Beginning with a receiving station and ending with a shipping station, material passes through various workstations and forms one or more paths. With equation (1), the input flow rate for each process within each workstation necessary to generate an output flow rate to meet shipping rates at the shipping stations are found by tracing all the paths that all the material, and their components, took through the factory. $FLOWIN_{ij}$ and $FLOWOUT_{ij}$ for each process i within workstation j are thus found.

The next step, described by block 208, is a loop for determining for each workstation a capacity variable (CP). The capacity variable for a workstation is the sum of the effective processing times per unit of material for each process at the workstation multiplied by the output flow rate required by that process:

$$CP_j = (Peff_{ij})(FLOWOUT_{ij}) \quad (2)$$

The capacity variable is a measure of the capacity of the workstations to process all of the material necessary to meet the flow rate requirements for each process at the workstation. A workstation, for example, having a capacity variable equal to one is exactly at its capacity while a workstation having a capacity variable greater than one is over its capacity. In either of the above cases, the workstation will have only down time and processing time. These values are therefore determined. The workstation is, consequently, never idle and never has time to set up. These variables are therefore set equal to zero for the workstation.

Depending on what type of analysis the user has chosen, the next step of the data processing system is to proceed at decision point 210 to either a schedule analysis branch 211 or to a capacity analysis branch 212. Schedule and capacity analysis differ primarily in the flow rates used to analyze workstation performance. Schedule analysis is chosen by the user who wants to analyze the factory when it is producing a mix of materials to meet the entered shipping rates. With this analysis, the invention will provide the user with the actual batch size of materials required to meet a shipment schedule. With capacity analysis, the user analyzes the performance of the factory when it is processing at its capacity the same mix of materials but in the largest quantities possible. The user may use capacity analysis to determine which workstation(s) of the factory limits the maximum size of the factory output for a given mix of parts shipped.

Considering schedule analysis first, the schedule analysis subroutine starts at block 213 and is performed for each workstation having a capacity variable greater than one or equal to one if one or more processes have set up. These workstations have exceeded their limit for processing material at the output flow rates determined by the subroutine of block 206. This is indicated on the user interface of the data processing system. Block 228 is performed for each workstation having a capacity variable equal to one and having processes that have no set up time. These workstations have reached their maximum capacity for processing material at the output flow rates determined by the subroutine of block 206.

If the capacity analysis branch is taken, the subroutine represented by block 214 looks for the workstations with the largest capacity variable. It is the workstation with the largest CP that limits the output capacity of the factory. The software sets the variable $CP_{LG}$ equal to this value. $CP_{LG}$ is thus a ratio indicating the percentage of the processing capacity of the factory utilized to process material to meet the entered shipping rates.

In block 230 all capacity variables are redetermined after being adjusted to maximum capacity.

For the purposes of capacity analysis, those workstations with CP equal to $CP_{LG}$ are treated as being at capacity, or having a CP equal to one. Therefore, just as the schedule analysis subroutine of blocks 213 and 228 did for those workstations with capacity variables equal to one, the next subroutine of the capacity analysis, block 215, indicates that, for each workstation with a capacity variable equal to the value of $CP_{LG}$, the capacity of the workstation has been reached, which limit is indicated on both the batch size and the cycle time.

The next step within the capacity analysis branch 212, represented by block 216, adjusts the input and output flow rates of each process at each workstation to those of a factory running at its capacity. $CP_{lg}$ is the proportionately constant which relates flow rates determined to meet the entered shipping rates and the flow rates for a factory running at capacity. Therefore, the input and output flow rates for each process at each workstation determined by subroutine 206 can be easily adjusted to capacity flow rates by dividing each flow rate with $CP_{LG}$.

Thereafter the schedule analysis branch 211 and the capacity analysis branch 212 share common subroutines, beginning with the subroutine represented by block 218. The two analyses differ only in the flow rates used for each process. This subroutine determines for each workstation having a capacity variable less than one, the minimum allowable batch size for each process to meet the flow rates required of that process or uses the user supplied batch size if it is provided. The flow rates used for this computation are those determined by subroutine 206 for schedule analysis, or those determined by subroutine 216 for capacity analysis.

The next subroutine, represented by block 219, determines station cycle times for each workstation based on the batch sizes provided by block 218.

The next subroutine, represented by block 220, sets the variable %TOTAL equal to the value of one for each workstation with a capacity variable less than or equal to one. A workstation, by definition, must be either down, processing, or setting up. When not in one of those three states, it is idle. %TOTAL for a workstation is therefore equal to the sum of set-up time, processing time, down time and idle time for the workstation. By definition, a workstation at or below capacity spends all of its time in one of these four states. %SETUP, %PROC, %DOWN, and %IDLE are all determined at this point.

Those workstations having a capacity variable greater than or equal to one cannot, however, have set-up time or idle time. For workstations with a capacity variable greater than one, the subroutine represented by block 222 sets the %TOTAL variable equal to the percent of down time plus the percent of processing time which will equal more than 100%. SETUP and %IDLE are therefore set equal to zero, and %PROC and %DOWN are determined.

The next subroutine in the software, represented by block 224, determines the value of the batches used by each process, the value of the scrap generated by each process, the amount of trapped inventory at each process due to the transport and queue time to the next process for the output of the process, and the value of the trapped inventory.

The next subroutine in the software, represented by block 225, determined the value of the Manufacturing Cycle Time (MCT) for each part that is shipped. MCT indicates the path, having the longest duration, through the factory for each part that is shipped from the factory.

The final step, as represented by block 226, is to display all of the results to the user. The following values are displayed both in tabular form and in graphical form: batch size for each process; cycle time for each workstation; percent set-up time, percent down time, percent idle time, percent processing time, and percent total time for each workstation; batch value, scrap value, amount of trapped inventory, trapped inventory value for each process; and Manufacturing Cycle Time for each part shipped from the factory.

The user may use these values provided by the invention, such as batch size, to determine the optimal conditions for running the current factory and to schedule production. The user may also use them to make improvements to the manufacturing system. For example, workstations with the longest cycle times are the greatest obstacles to low cost, high quality manufacturing. Improvements are also prioritized. The workstation with the longest cycle time or the largest batch sizes require the most improvement. How best to improve the workstation can also be determined by the user. If the long cycle times are caused by long processing times, for example, some sort of automation or robotics may be the best mode for improvement to reduce actual processing time per part. If, on the other hand, the slow cycle time is caused by long set-up times, rapid changeover is the best method of improvement. The invention thus provides an analytical tool with which to make informed decisions about manufacturing processes.

FIGS. 3 through 9 illustrate the detailed steps for certain of the subroutines discussed in connection with FIG. 2.

Figure 3:
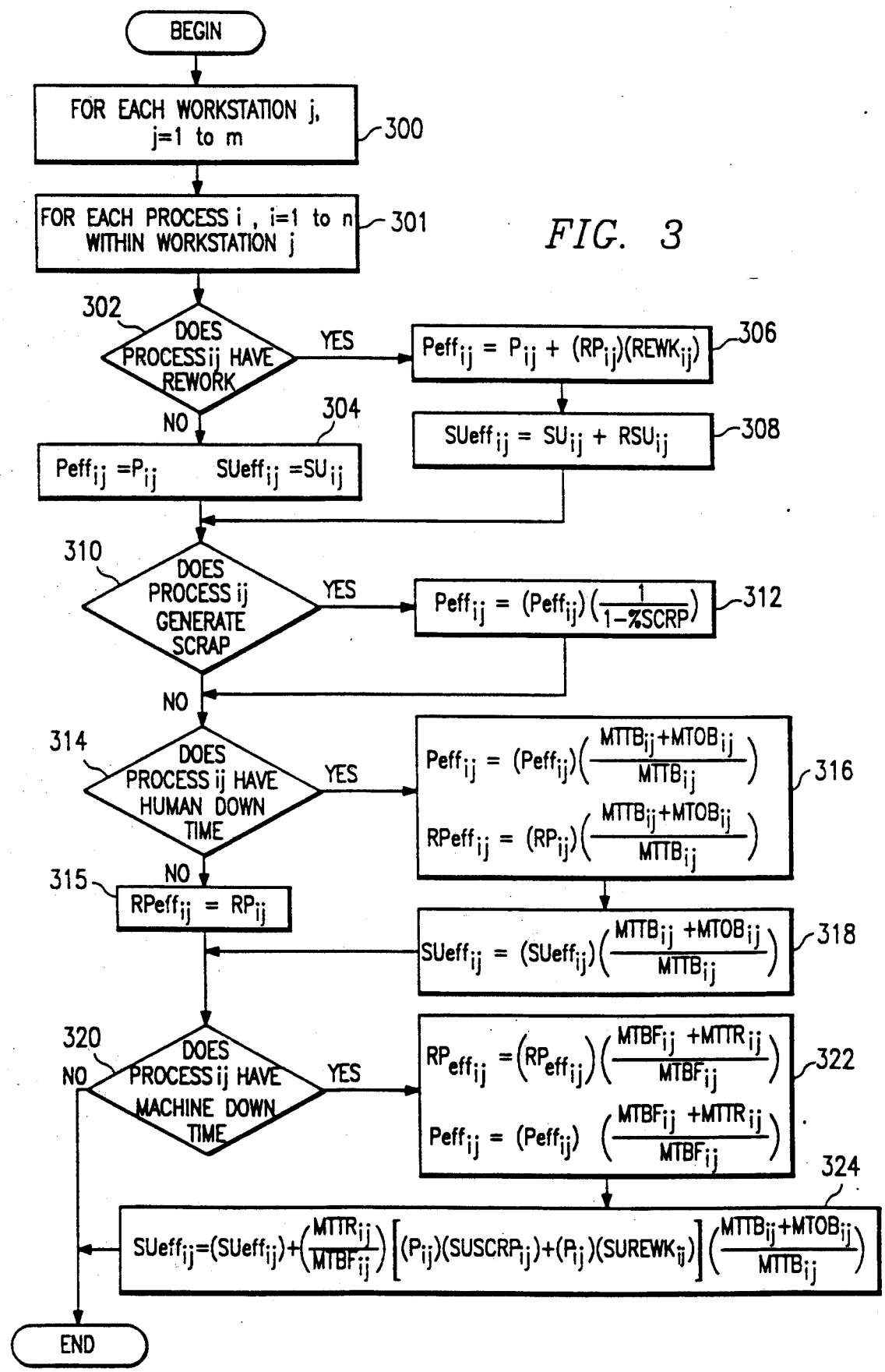
FIG. 3 is a flow diagram of one of the subroutines in FIG. 2 for determining the effective processing time per part for each process and the effective set-up time for each process.

Referring first to FIG. 3, there is shown the detailed flow diagram of the subroutine represented by block 204 of FIG. 2. This subroutine determines the effective processing time per part and the effective set-up time for each process at each workstation. The subroutine is iteratively executed as a loop, and is performed, as shown by blocks 300 and 301, for each process i, i 1 to n, within each workstation j, j=1 to m. As shown by decision symbol 302, the subroutine begins with the decision of whether process i inside workstation j generates material that is to be reworked. If not, control passes to block 304, where it causes the effective processing rate for process i of workstation j (Peff$_{ij}$) to be set equal to the processing rate (P$_{ij}$) entered by the user. Similarly, the effective set-up time for process i at workstation j (SUeff$_{ij}$) is set equal to set-up time entered by the user (SU$_{ij}$). If there is rework, block 306 determines the effective processing time according to the following equation, $$Peff_{ij} = P_{ij} + (RP_{ij})(\%REWK_{in}) \quad (3)$$

where $RP_{ij}$ is the rework processing time per part and %REWK$_{in}$ is the percentage of rework generated by that process. In block 308, the effective set-up time for the process is determined according to the following equation, $$SUeff_{in} = SU_{ij} + RSU_{ij} \quad (4)$$

where RSU is the rework set-up time.

At step 310, a determination is made whether the process generates any scrap. If so, the effective processing rate is redetermined at step 312 according to the following equation, $$Peff_{in} = (Peff_{in})(1/(1-\%SCRP_{ij})) \quad (5)$$

where %SCRP$_{in}$ is the percentage of scrap generated by process i in workstation j. Effective set-up time need not be redetermined because it is not affected by scrap. By definition, no good parts are being generated during the set-up of the process and any parts or materials generated by the set-up of the process are scrapped or will be reworked.

After the effect of scrap is determined, a determination is made at step 314 of whether the process has human down time. Human down time slows effective processing time per unit and the effective rework processing time per unit. Thus, if human down time is present, the effective processing time per unit must be redetermined to take into account the affect of human down time as shown in block 316, according to the following relationship:

$$Peff_{in} = (Peff_{in})((MTTB_{in} + MTOB_{in})/MTTB_{ij}) \quad (6)$$

MTTB$_{ij}$ is the mean time to break for process i inside workstation j, and MTOB$_{ij}$ is the mean time on break for process i inside workstation j. Similarly, the effect of human down time on rework processing time (RP$_{in}$) is determined, as shown in block 316, according to the following:

$$RPeff_{in} = (RP_{ij})((MTTB_{ij} + MTOB_{ij})/MTTB_{ij}). \quad (7)$$

It should be noted that Peff need not be redetermined with RPeff$_{ij}$ in place of RP$_{ij}$ in equation (3). The effect of human down time on RP$_{ij}$ for the purpose of determining Peff$_{ij}$ is done with equation (6). RPeff$_{ij}$ is determined at this stage because it will, as will be shown in connection with block 712 of FIG. 7, determine in part the cycle time CT$_j$.

After block 316, the subroutine determines, as shown in block 318, the effect of human down time on set-up time. The equation shown in block 318 is identical in form to equations (6) and (7). If there is no human down time, the value of the variables Peff$_{ij}$ and SUeff$_{is}$ remain unchanged and RPeff is set equal to RP$_{ij}$ in block 315.

Proceeding to decision block 320, the presence of machine downtime requires the recomputation of the effective processing time per unit, the effective rework processing time per unit and the effective set-up time per process. If there is machine down time, the effect of machine down time on rework processing times and processing times is determined, as shown in block 322.

The next step of the subroutine, block 324, determines the effect of machine down time on set-up time. It should be appreciated that, by definition, machine failure can occur only during processing. Set-up time, technically, is not affected by machine downtime. However, in modeling the factory, the time to built start-up scrap or start-up rework is allocated to the set-up time for the process. The time it takes to build these start-up units is the number of start-up rework units (SUREWK) multiplied by the effective processing time per unit plus the number of start-up scrap units (SUSCRP) multiplied by the effective processing time per unit. Since the effective processing time per unit is affected by machine down time, the presence of machine down time requires the redetermination of the effective set-up time for the process. Hence, as shown in block 324, the effective set-up time is redetermined. The process in FIG. 3 is repeated for every process at every workstation, in the factory at which point the subroutine ends.

Figure 4:
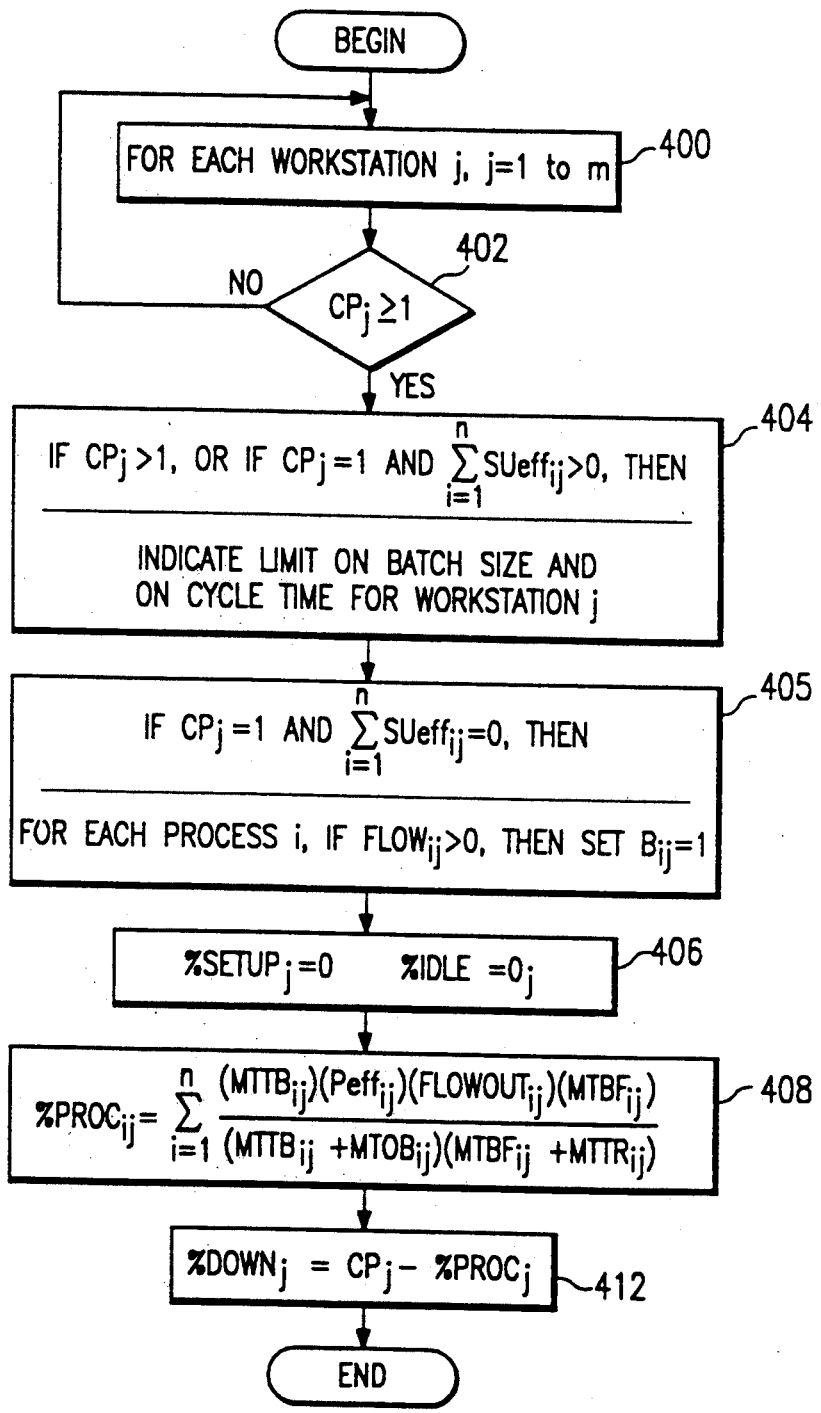
FIG. 4 is a flow diagram of a subroutine in the invention that determines the percentages of time the workstation is setting up, idle, down, and processing for workstations having capacity variables greater than or equal to one (when the workstation is overcapacity).

FIG. 4 is a detailed flow diagram of the subroutine represented by blocks 213 and 228 of FIG. 2, which are part of the schedule analysis branch 211 and blocks 220 and 222 of the invention. As shown in block 400, the subroutine is iteratively executed for each workstation. The loop begins by determining at step 402, whether the workstation j has a capacity variable greater than or equal to one. If so, the user is informed at step 404 by an appropriate message on the user interface that the workstation is limited by its capacity. The batch sizes and cycle times are shown as being at "limit" if the sum of the set-up times of all of the processes in the workstation, with flow rates greater than zero, is greater than zero. Then, as indicated by block 405, if the capacity variable is equal to one and the sum of the set-up times of all of the processes in the workstation with flow rates greater than zero is equal to zero, then the batch sizes of the required materials are set equal to one. Next, as indicated by a block 406, the subroutine sets equal to zero the variables for the percentage of time that the workstation spends setting up (%SETUP) and the percentage of time that the workstation remains idle (%IDLE). A capacity variable equal to or greater than one means that the cumulative demand on the workstation equals or exceeds its capacity. Therefore, by definition, there is no idle time and there is no time left for setting up between processes. The workstation must spend all available time processing units when it is not down due to machine down time or human down time.

Workstations with a capacity variable equal to or greater than one spend all of their time either processing or down. In order to determine the percent of time a workstation is down, the subroutine illustrated in FIG. 4 determines the percentage of time that the workstation is up, or in other words, not down due to either human time or machine down time. The percentage of up time (%PROC$_j$) is determined by accounting for the amount of human down time and machine down time. This determination is done using the equation shown in block 408. %DOWN$_j$ is related to %PROC$_j$ by the following:

$$\%DOWN_j = CP_j - PROC_j. \quad (8)$$

This relation is, as shown in block 412, used to determine %DOWN$_j$. The subroutine is repeated for each workstation.

Now referring to the capacity analysis branch 212 in the flow diagram of FIG. 2, the details of the two subroutines shown by blocks 214 and 215 will now be described.

Figure 5:
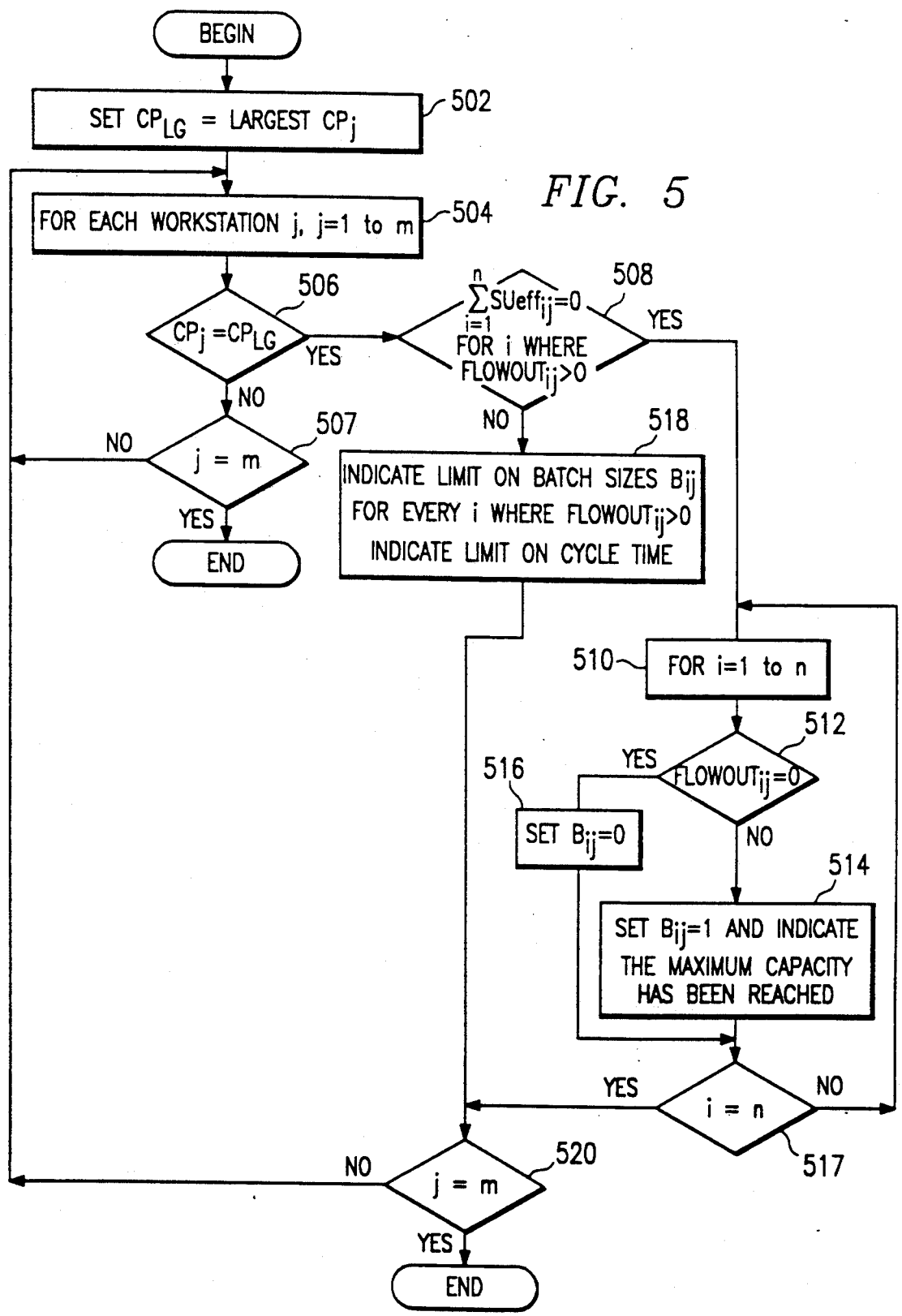
FIG. 5 is a flow diagram for a subroutine in the capacity analysis branch of the invention that determines which workstation(s) have the largest capacity variable and sets the batch sizes if no set up time is present.

Referring to FIG. 5, there is shown a detailed flow diagram corresponding to the subroutines indicated by blocks 214 and 215 of FIG. 2. Block 502 represents a first iteration performed for every workstation j, j=1 to m, that sets CP$_{LG}$ equal to CP$_j$ if CP$_j$ is greater than CP$_{LG}$.

Beginning at block 504 a second iteration is performed for each workstation j, j=1 to m. The first step of the second iteration, shown by block 506, determines if CP$_j$ equals CP$_{LG}$. If it does not, the subroutine returns to block 504. Otherwise, the next step, block 508, involves the determination of whether any set up time is present in workstation j. If set up time is present for any process i that has a FLOWOUT$_{ij}$ greater than zero, limit is indicated on the batch size (B$_{ij}$) as shown in block 518. A limit is also indicated on the cycle time (CT$_j$). If set up time is not present in workstation j then a loop is performed for process i=1 to n as indicated by block 510. Block 512 checks to see if FLOWOUT$_{ij}$ equals zero. If FLOWOUT$_{ij}$ equals zero, then B$_{ij}$ is set equal to zero as shown in block 516. If FLOWOUT$_{ij}$ is greater than zero then B$_{ij}$ is set equal to one as shown in block 514 and it is indicated on the user interface that the maximum capacity has been reached. Block 517 completes the loop and tests to see if i equals n. If the condition i equals n is met, then block 520 tests to see if j equals m. If not the next workstation is tested. When if j equals m the subrouting is completed.

As indicated by decision symbols 507 and 520, steps 504 to 518 are repeated for the remaining workstations j, until j equals m, m being the number of workstations in the factory.

Turning now to FIG. 6, there is shown the flow diagram corresponding to subroutines 216 and 230 of FIG. 2. The subroutine is repeated for each workstation, as indicated by block 602 and decision symbol 614. Within the loop for each workstation j there is nested a second loop performed for each process i, as indicated at block 604 and decision symbol 610. As shown in blocks 606 and 608, flow rates for the process i at workstation j are redetermined and set. FLOWOUT$_{ij}$ is set in step 606 equal to the old FLOWOUT$_{ij}$, determined from the given shipment schedule in subroutine 206 of FIG. 2, divided by CP$_{LG}$. Similarly, in step 606, FLOWIN$_{ij}$ is set in equal to the old FLOWIN$_{ij}$, determined from the subroutine 206 of FIG. 2, divided by CP$_{LG}$. Steps 604, 606 and 608 are repeated for each process within workstation j. Once the new flow rates for each process of a workstation are redetermined, a new capacity variable for the workstation is determined based on these new flow rates. The equation for determined the capacity variable is shown in block 612, and is identical to equation (2). The entire subroutine is then iteratively executed for every workstation in the factory.

Figure 7A:
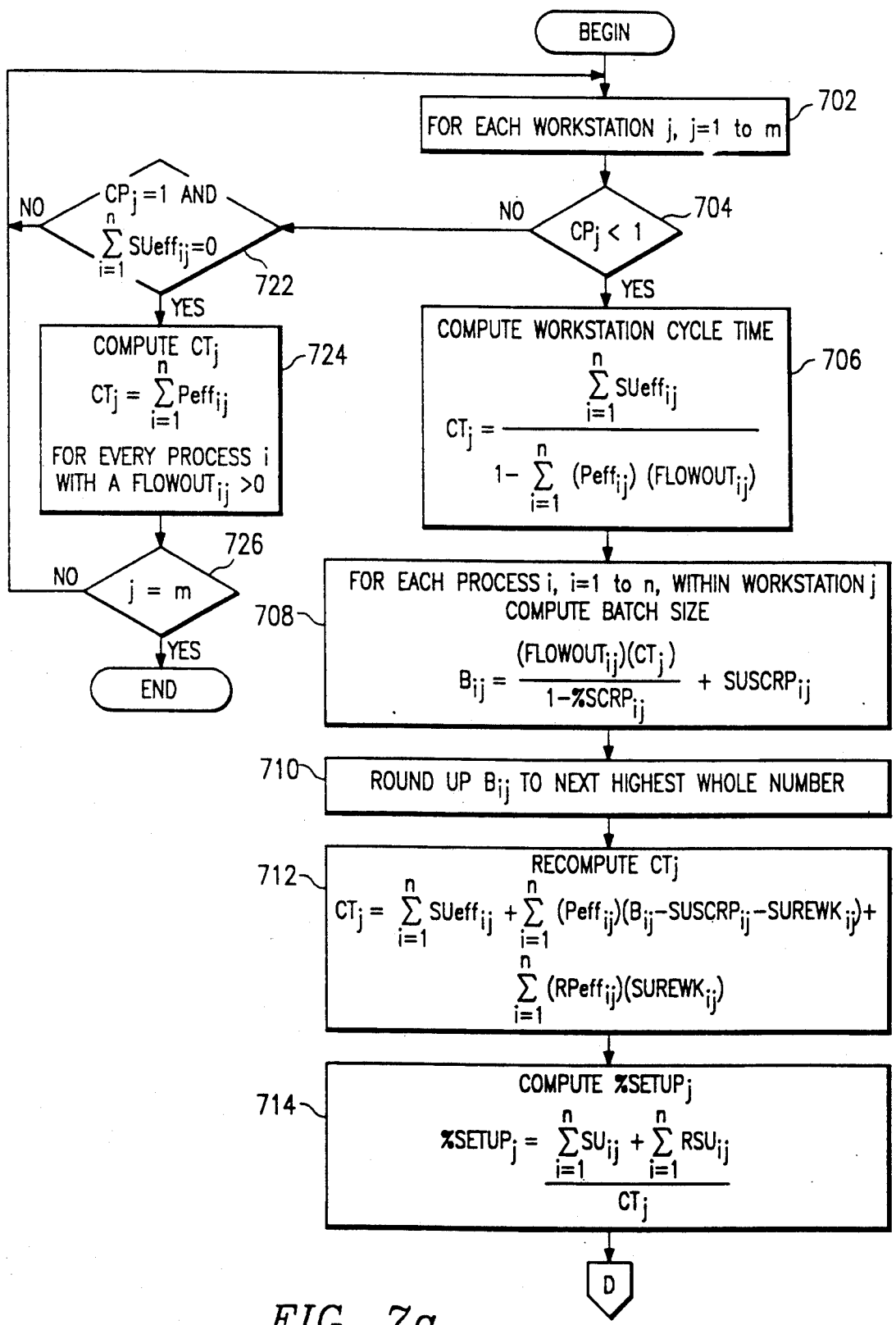

FIG. 7, is a detailed flow diagram for the subroutine represented by block 218 of FIG. 2. This iterative subroutine, as shown by block 702, is executed for each workstation. Furthermore, as shown in step 704, the subroutine is performed only for workstations with capacity variables less than one. If the capacity variable is equal to one, block 722 tests to see if the workstation has any set up time. If the workstation does not, the cycle time is determined for that workstation according to the equation in block 724.

The first step of the loop, shown in block 706, is to determine cycle time for the workstation. This equation, shown in block 706, can be shown to be derived from the following equation:

$$CT_j = [SUeff_{ij} + (Peff_{ij})(B_{ij})] \quad (9)$$

As can be seen from equation (9), cycle time for a workstation is the sum of: the effective set-up times plus the product of the effective processing rate and the batch size for each process i within workstation j. As was described in connection with FIG. 3, step 324, the time to process start-up rework the first time and start-up scrap is incorporated into the effective set-up time. The equation in block 706 is easily derived by substituting for $B_{ij}$ in equation (9) with the following equation and solving for $CT_j$:

$$B_{ij} = [(FLOWOUT_{ij}(CT_j)/(1 - \%SCRP_{ij})] + SUSCRP_{ij} \quad (10)$$

After the cycle time for the workstation is determined, the batch size for each process is determined according to the equation contained in block 708. The batch size calculated for each process is then, as described in block 710, rounded up to the next highest whole number if not equal to a whole number. The steps in block 708 and the rounding up in block 710 must be performed for each process within workstation j. Steps 708 and 710 are therefore iteratively executed on each process. The steps of blocks 708 and 710 can be done in the same loop. Rounding up is necessary because a process will not produce a fraction of the unit of material; it must produce the entire unit. Requiring the workstation to build that extra fraction of a unit for each process, however, lengthens the cycle time of the workstation. Therefore, as shown in block 712, the cycle time is redetermined using the direct method of simply adding the components of time together now that the batch size is known.

As shown in blocks 714, 716, 718 and 720, %SETUP$_j$, %DOWN$_j$, %PROC$_j$ and %IDLE$_j$ are determined. The equations with which to determine the value of each of these variables are shown in the respective blocks.

After step 720, the subroutine is repeated, beginning with step 702, for every workstation in the factory.

Going back to step 722, if the capacity variable is equal to one and there is no set up time in the workstation for the mix of products being pulled through that workstation, then, as shown in block of 405 of FIG. 4, the batch size ($B_{ij}$) is equal to one. Block 724 then determines the cycle time of such a workstation by adding up all of the effective processing times (Peff$_{ij}$) for each process with a flow out (FLOWOUT$_{ij}$) that is greater than zero. Block 726 then tests to see if all of the workstations have been tested. If so, the subroutine ends. If not, the next workstation is tested.

Now turning to FIG. 8, there is shown the detailed flow diagram for the subroutine represented by block 224 in FIG. 2. This subroutine, as indicated by block 802, is performed for each process i at a workstation j and for each workstation in the factory. First, as shown in step 804, the amount of trapped inventory (TPINV) at each process due to the time to transport the units of material to the next process and the time the unit of material must wait in queue for the next process (collectively called transport and queue time (TPQP)) is determined with the relation shown in the block.

Next as shown in block 806, the TPINV$_{ij}$ value is multiplied by the value of the unit of material being processed (VALUE), to obtain a trapped inventory value (TPINV VALUE). The value of the batch size is also determined as shown in block 708, by multiplying the batch size ($B_{ij}$) times the value of the units being processed (VALUE$_{ij}$). Finally, the value of the scrap generated by each process is determined with the equation in block 810. The subroutine then returns to block 802 and repeats for every process within every workstation in the factory.

Figure 9:
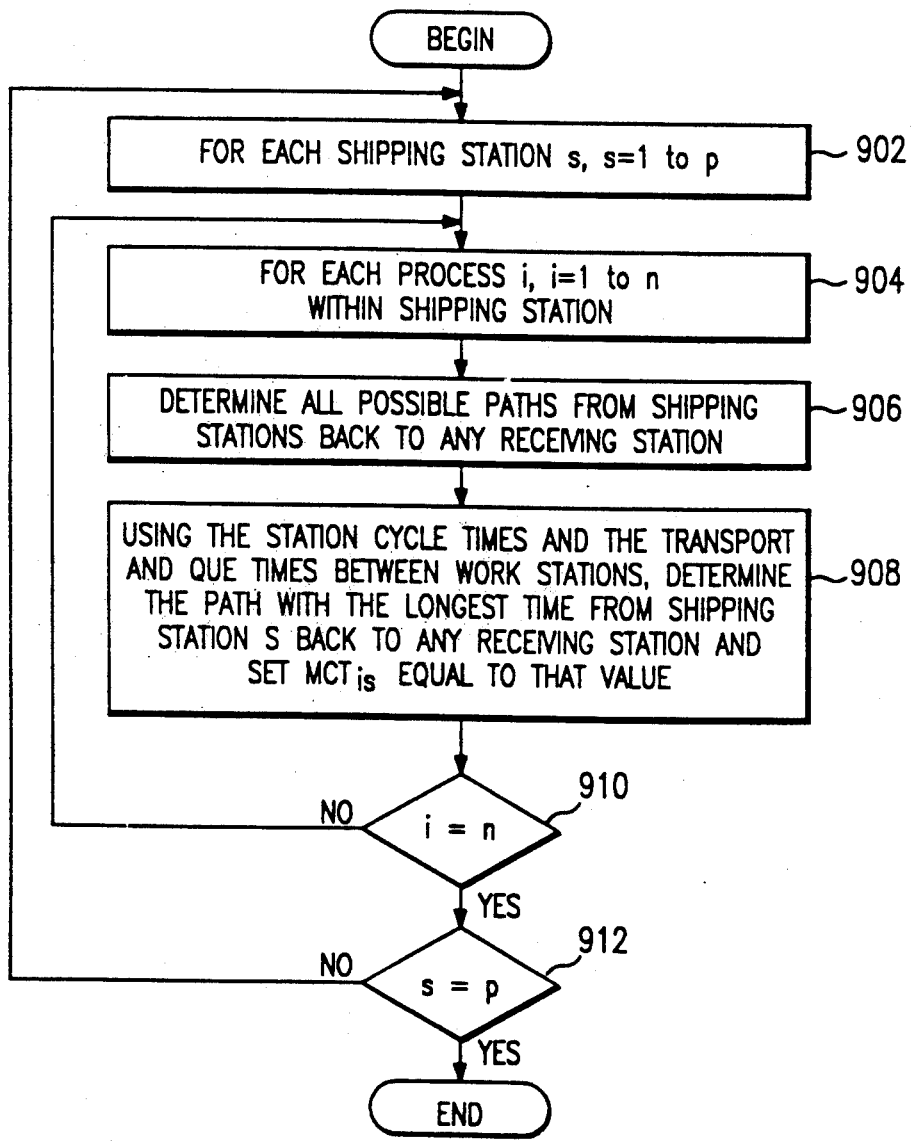
FIG. 9 is a flow diagram for the subroutine that determines the manufacturing cycle time of the factory.

Finally, FIG. 9 shows the detailed flow diagram of the subroutine, represented by block 225 in FIG. 2 for determining the manufacturing cycle time (MCT$_{is}$). This subroutine, as indicated by blocks 902 and 904, is performed for each process i at each shipping station S, and for each shipping station in the factory. First, as shown in step 906, all possible paths for each process from the shipping station back to a receiving station are determined. Next, as shown in block 908, the length of time for parts to travel through each path is determined using the cycle times of each work station and the transport and que times of each work station along that path. The subroutine then returns to block 904 and repeats for every process within every shipping station in the factory.

Now referring to FIGS. 10 through 33, there is shown two examples of a schedule analysis performed by the invention on a model factory. FIGS. 10 through 21 demonstrate a schedule analysis of the factory before any improvements are made to it. FIGS. 22 through 33 demonstrate a schedule analysis performed on the factory after improvement is made to the percent rework of the processes "Solder P" and "Solder Q" in workstation "Solder".

Figure 10:
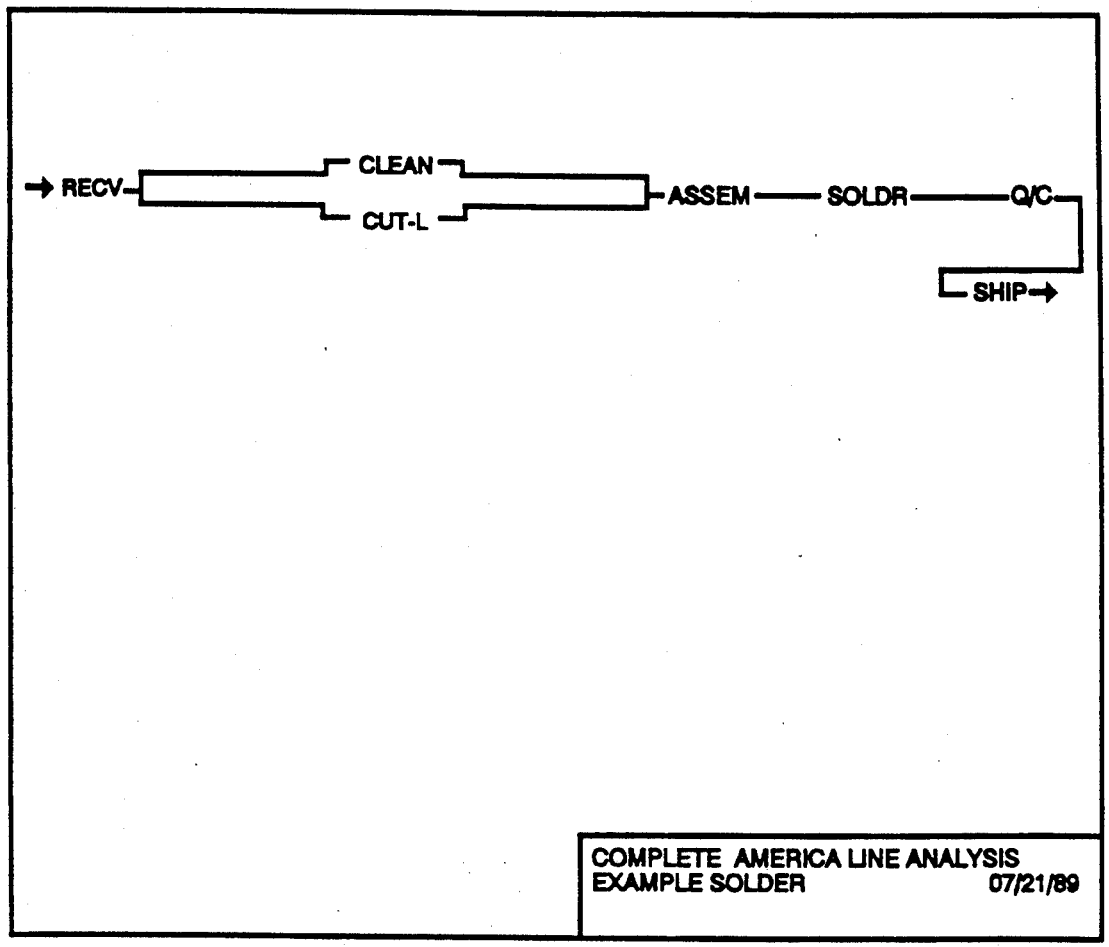
FIG. 10 shows an example of a model factory diagram for schedule analysis.
Figure 17:
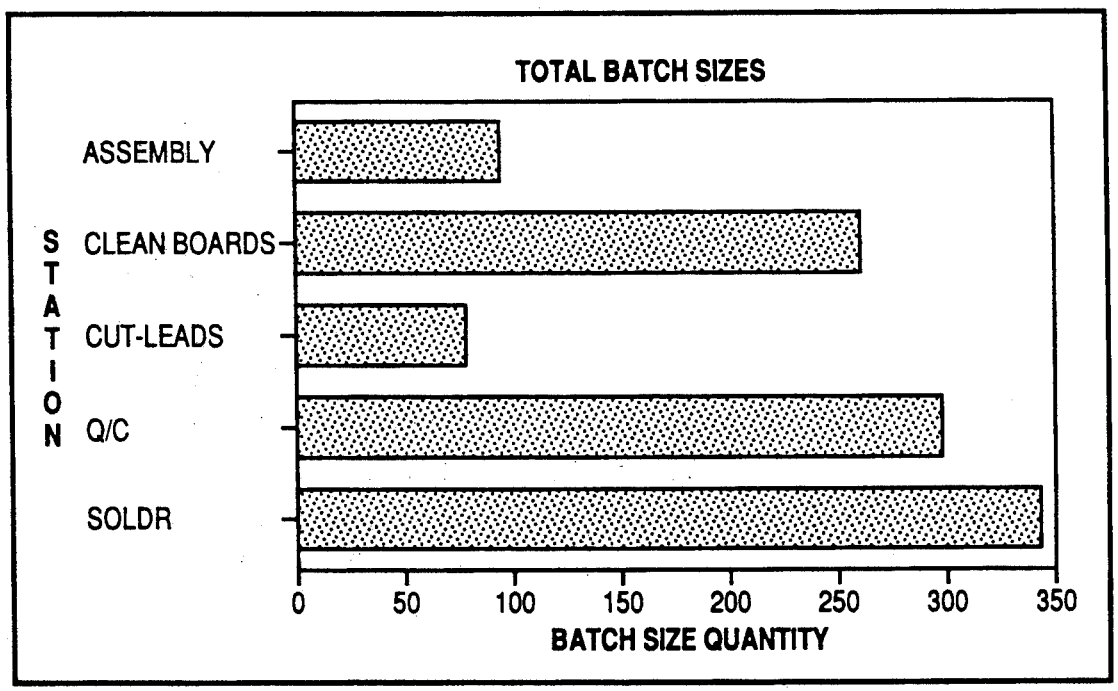
FIG. 17 is a graphical representation of the sums of the batch sizes for each station in the model factory determined by the invention.
Figure 22:
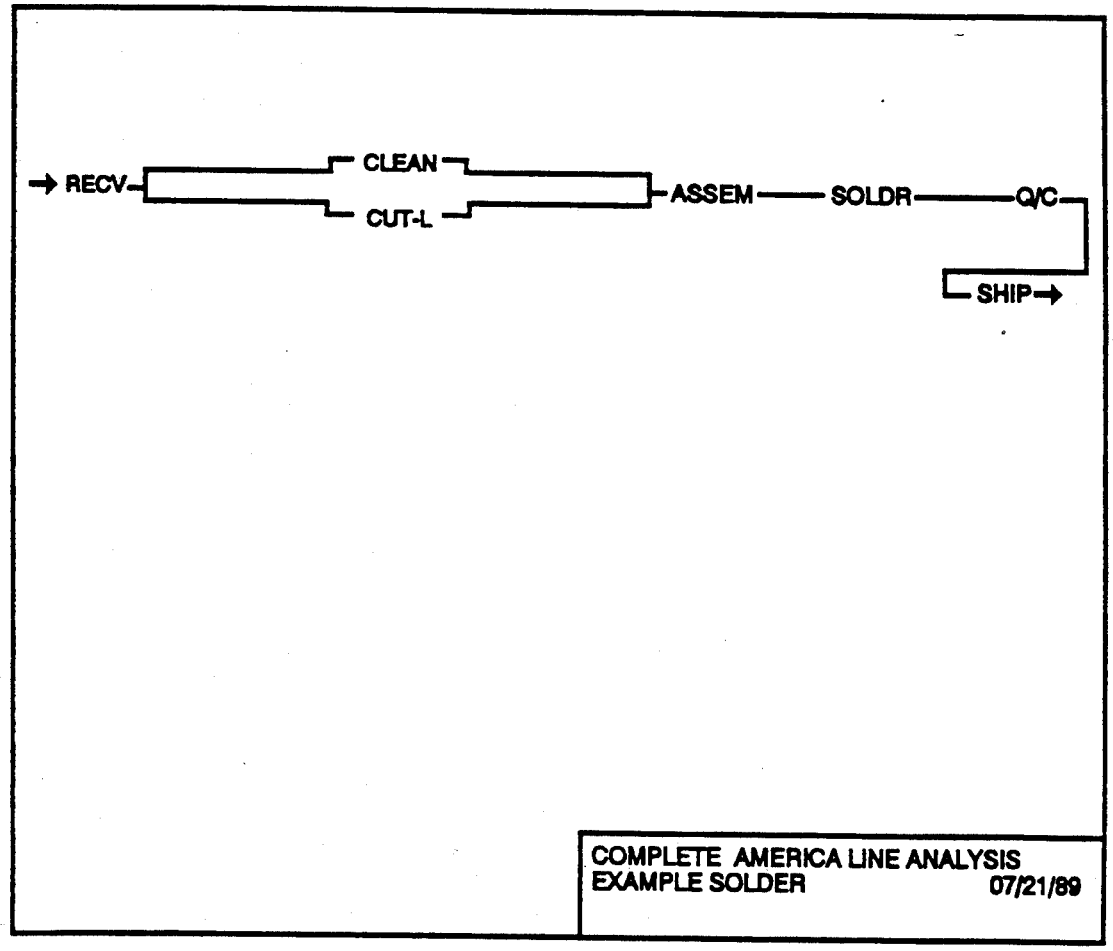
FIG. 22 shows an example of a model factory diagram for an improved factory.
Figure 29:
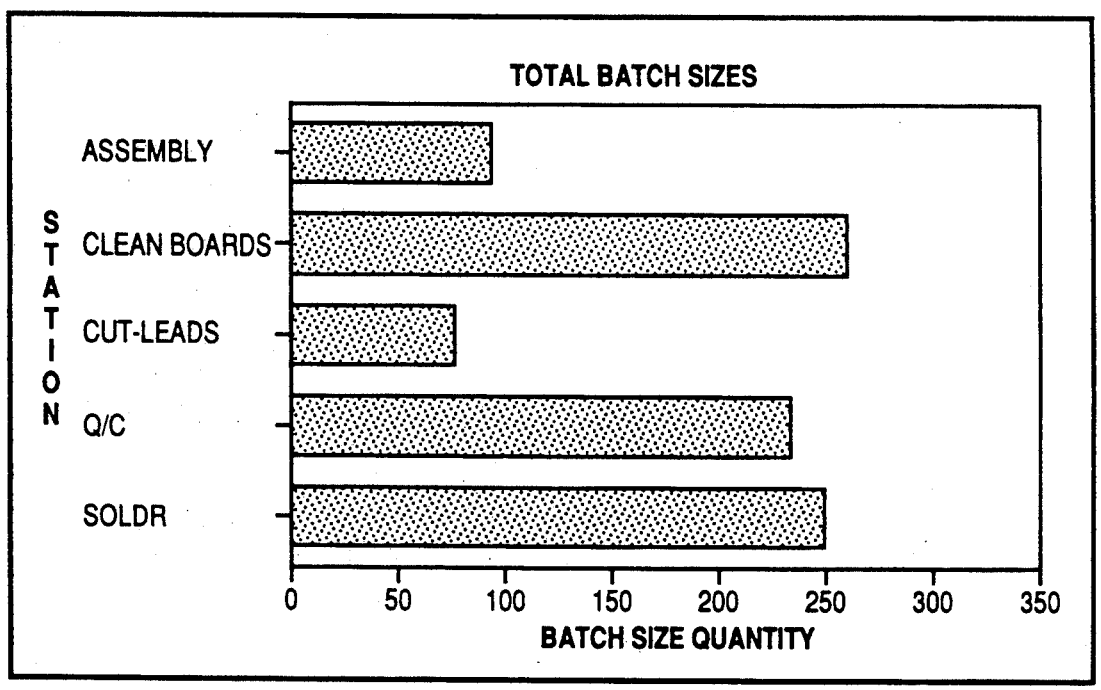
FIG. 29 is a graphical representation of the sums of the batch sizes for each station in the improved model factory determined by the invention.

Now referring to FIGS. 10 through 15, there is shown the data that is provided by the user to the invention: in FIG. 10, a factory diagram; in FIGS. 11-13 the data for each process in the factory; in FIG. 14, an example of the bill of material for the "Assembly P" process of the station "assembly", which bill shows the amount of input material that comprises one unit of output material; and, in FIG. 15, the shipping rates for each product shipped. In FIGS. 16 through 21, there is shown the information determined by the invention and provided to the user: in FIG. 16, the batch sizes, batch values and scrap values determined by the invention for each process; in FIG. 17, a graphical representation of the sums of the batch sizes for each station determined by the invention; in FIG. 18, the cycle times and percentage breakdown of the time spent at each station; in FIG. 19, the amount of each part trapped at each station and the corresponding part values; in FIG. 20, the manufacturing cycle time for each part shipped; in FIG. 21, the worst-case path through the factory that is used to determine the manufacturing cycle time.

Based on the results of the first analysis the solder station, because it has longer cycle times and the largest batch sizes, is making the greatest contribution to the cycle time. The solder station, more than any other station, slows the movement of parts through the factory. It is, therefore, the station most in need of improvement. Since a reduction in the percent rework will result in a reduction in the batch sizes and cycle times for the quality control station (the second station most in need of improvement), percent rework is chosen as the best mode of improvement.

Now referring to FIGS. 22 through 33 (FIGS. 22 to 33 correspond, respectively, to FIGS. 10 to 21), a second run of the schedule analysis program with a reduction in the percent rework from 30% to 27% is demonstrated. The value of 27% was chosen to demonstrate that a small reduction in the percent rework results in a dramatic improvement in the batch sizes and cycle times for both the solder station and the quality control station. As shown in FIG. 28, the batch sizes for the solder station were reduced to 124 units, and the batch sizes for the quality control station were reduced to 116 units—improvements of 47 and 33 units, respectively. Correspondingly, the value of the batch sizes in both the workstations also dropped; in quality control from a total of $75,990.00 to $59,160.00 and in solder, from a total of $82,080.00 to $59,520.00, representing significant cost savings to the factory. In FIGS. 30 and 32, there can be seen a significant improvement in cycle times for each work station and of the manufacturing cycle times for each part. The solder and quality control stations are no longer the chief causes of parts moving slowly through the factory.

With this information, the processes at the solder station can be improved with engineering methods so as to reduce the percent rework from 30% to 27%.

Other changes to the factory can also be quicky and easily tried to determine the character and magnitude of the changes that result in the improvements required.

Only the preferred embodiment of the invention has been described. It should be understood that the invention is not limited to the embodiments disclosed, but is intended to embrace any alternatives, modifications, rearrangements, or substitutions of parts or elements as fall within the spirit and scope of the invention.

| APPENDIX I | |
|---|---|
| VARIABLE | DEFINITION |
| j | Refers to the "jth" the workstation |
| i | Refers to the "ith" process of a particular workstation |
| P | The processing time per unit of material |
| SU | Set-up time per process |
| Peff | Effective processing time per unit of material |
| SUeff | Effective set-up time per process |
| RSU | Rework set-up time |
| % REWK | Percentage of rework for a process |
| RP | Processing time for a unit of material to be reworked |
| % SCRP | Percentage of scrap generated by a process |
| SUSCRP | The amount of scrap generated by the set up of a process |
| MTTB | Mean time to break for a process (human) |
| MTOB | Mean time on break for a process (human) |
| MTBF | Mean time between failures for a process (machine) |
| MTTR | Mean time to repair for a process (machine) |
| SUREWK | Number of units of material for rework generated by the set-up of a process |
| FLOWIN | Input flow rate for a process required to support an output flow rate |
| FLOWOUT | Output flow rate required of a process |
| MCT | Manufacturing cycle time through the factory |
| CP | A capacity variable for a workstation |
| % SETUP | Percent of time a workstation spends setting up |
| % IDLE | Percent of time a workstation is idle |
| % DOWN | Percent of time a workstation is down due to human down time or machine downtime |
| % PROC | Percent of time a workstation is actually manufacturing good material |
| B | Minimum batch size required for a process to produce requested flow rates |
| CT | The cycle time for a workstation |
| % TOTAL | Equals % SETUP + % DOWN + % PROC + % IDLE for a workstation |
| TPINV | Trapped inventory at a process |
| TPQT | Transport and queue time at the output of a process |
| VALUE | Value in dollars of a unit at a process |
| BATCH VALUE | Value in dollars of a batch of material to be processed by a process |
| SCRAP VALUE | Value in dollars of scrap generated for a process |
| TPINV VALUE | Value in dollars of the inventory of units trapped at a process |
| % REWKEL | Percentage of rework that is done at a different workstation |
| MANBAT | Manual batch size to be used instead of allowing them to be calculated based on shipping rates |

I claim:

1. A method of scheduling and operating production of a factory having a plurality of work stations, each work station performing one or more processes, in order to meet a predetermined shipping schedule, comprising the steps of:
   (a) determining the rate of material flow out (FLOWOUT$_{ij}$) of each process within each workstation of a factory necessary for the factory to meet a predetermined shipping schedule;
   (b) determining the size of the batch of material for each process of each workstation necessary to meet each material flow rate determined in step (a) for the workstation; and
   (c) operating each process at each workstation with the batch sizes determined in step (b).

2. The method for scheduling and operating production of a factory as set forth in claim 1 wherein the size of the batch of material for process i at workstation j is determined in step (b) substantially in accordance with the following relationship:

$$B_{ij} = [(FLOWOUT_{ij})(CT_j)/(1 - \%SCRP_{ij})] + SUSCRP_{ij},$$

where, for process i within workstation j, $B_{ij}$ is the batch size, FLOWOUT$_{ij}$ is the rate of material flow out of the process in the workstation necessary for the factory to meet a predetermined shipping schedule, $CT_j$ is the cycle time of the workstation, %SCRP$_{ij}$ is the percentage of scrapped material produced by the process and SUSCRP$_{ij}$ is the amount of scrapped material produced by the set-up of the process.

3. The method for scheduling the operating production of a factory as set forth in claim 2 wherein $CT_j$ is determined based on the based upon the following relationship:

$$CT_j = [\Sigma SUeff_{ij}]/[1 - \Sigma(Peff_{ij})(FLOWOUT_{ij})]$$

where, for process i within workstation j, $SUeff_{ij}$ is the effective set-up time, $Peff_{ij}$ is effective time to process one unit of material, $FLOWOUT_{ij}$ is the material output flow rate, and n is the number of processes performed by workstation j.

4. The method for scheduling and operating production according to claim 3 further comprising the steps of:
redetermining $Peff_{ij}$ if the process i produces rework according to, $$Peff_{ij} = P_{ij} + (RP_{ij})(\%REWK_{ij}),$$

where $RP_{ij}$ is the rework processing rate and $\%REWK_i$ is the AMOUNT percent of material reworked; and
redetermining $Peff_{ij}$ if process i within workstation j produces scrap according to, $$Peff_{ij} = (Peff_{ij})(1/(1-\%SCRP_{ij})),$$

where $\%SCRP_{ij}$ is the percentage of scrap.

5. The method for scheduling and operation production according to claim 3 further comprising the steps of:
redetermining $Peff_{ij}$ if process i within workstation j has associated with it human down time according to, $$Peff_{ij} = (Peff_{ij})([MTTB_{ij} + MTOB_{ij}]/MTTB_{ij}),$$

where $MTTB_{ij}$ equals the mean time between human breaks and $MTOB_{ij}$ equals the mean time on break; and
redetermining $Peff_{ij}$ if process i has associated with it machine down time according to, $$Peff_{ij} = (Peff_{ij})([MTBF_{ij} + MTTR_{ij}]/MTBF_{ij}),$$

where $MRBF_{ij}$ equals the means time between machine failures and $MTTR_{ij}$ equals the mean time to repair.

6. The method for scheduling and operating production according to claim 3 further comprising the step of:
determining $SUeff_{ij}$ if process i within workstation j has associated with it rework according to $$SUeff_{ij} = SU_{ij} + RSU_{ij},$$

where $RSU_{ij}$ is the rework setup time.

7. The method for scheduling and operating production according to claim 3 further comprising the step of:
redetermining $SUeff_{ij}$ if process i has associated with it human down time according to, $$SUeff_{ij} = (SUeff_{ij})([MTTB_{ij} + MTOB_{ij}]/MTTB_{ij})$$

where $MTTB_{ij}$ is the mean time to break and $MTOB_{ij}$ is the means time on break.

8. The method for scheduling and operating production according to claim 3 further comprising the step of:
determining the percentage of time that the workstation is processing material.

9. The method for scheduling and operating production according to claim 3 further comprising the step of: determining the time during which the workstation is down due to human down time and machine down time.

10. A method for scheduling and operating a factory having a plurality of workstations, each workstation performs one or more processes, each process operating on a batch of material, the method comprising the steps of:
determining the rate of material flow out ($FLOWOUT_{ij}$) of each process within each workstation of a factory for the factory to meet predetermined shipping rates;
determining the cycle time $CT_j$ for each workstation j to process a batch of material based upon the following relationship:

$$CT_j = [\Sigma SUeff_{ij}]/[1 - \Sigma(Peff_{ij})(FLOWOUT_{ij})]$$

where, for process i within workstation j, $SUeff_{ij}$ is the effective set-up time, $Peff_{ij}$ is effective time to process one unit of material, $FLOWOUT_{ij}$ is the material output flow rate, and n is the number of processes performed by workstation j; and
identifying inefficient workstations having the longest cycle times by an evaluation of cycle times and batch sizes; and
operating the processes performed by the identified workstations having the longest cycle times to reduce the batch size and cycle time of the identified workstations.

11. The method of claim 10 wherein the cycle time $CT_j$ is determined when the factory is operating at capacity to manufacture a mix products at the shipping rates.

12. The method of claim 11 wherein the step of determining $CT_j$ when the factory is operating at capacity includes the step of linearly adjusting the flow rates such that none of the workstations are producing at overcapacity and one or more workstations are at capacity.

13. A factory for manufacturing and shipping goods, the factory comprising:
a plurality of workstations, each workstation performing one or more processes, each process processing a batch of material having sizes determined by a system for scheduling manufacturing processes to meet a shipment schedule; and
a system for scheduling manufacturing processes to meet a shipment schedule, the system including: a memory for storing data values of variables received from the factory representing shipping rates of a mix of products produced by the factory, processing times per unit of material for each process in each workstation and set-up times for each process in each workstation; a microprocessor, coupled tot he memory, for determining the rate of material flow out of each process within each workstation necessary for the factory to meet the shipment schedule and for determining the size of the batch of material for each process of a workstation necessary to meet each material flow rate out of each workstation for each process; and a means for providing the batch size for a process to the factory.

14. A factory production scheduling and organization process, the process outputting information for optimizing production scheduling and organization and improving the efficiency of a factory production line to meet a predetermined shipping rate, the factory production line comprised of a plurality of interconnected workstations each performing at least one process, comprising the steps of:

receiving factory production line organization and operation data;

modelling the factory production line, according to the input factory data, by generating flow rates of material through each workstation for each process and processing capacities of each workstation for each process to meet the predetermined shipping rate for the production line;

analyzing the factory model according to the factory data and generated workstation material flow rates and workstation processing capacities for each process to evaluate workstation performance, process and production line performance, and identify optimal production line operating and supply characteristics; and operating the production line to implement the identified optimal production line operating and supply characteristics to substantially meet the predetermined shipping rate.

15. The factory production scheduling and organization process as in claim 14 wherein the step of modelling the production line comprises the steps of:

determining the effective processing time per material unit produced by each workstation for each process;

determining the effective set-up time for reconfiguring the process performed by each workstation;

generating, for each workstation in the production line, the flow rates of material through each workstation necessary to meet the predetermined shipping rate; and generating, from the material flow rates and effective processing time for each process performed by each workstation, the processing capacity of each workstation for each process.

16. The factory production scheduling and organization process as in claim 15 wherein the step of analyzing the factory model comprises the steps of:

determining material scheduling analysis for each workstation and process performed therein to evaluate performance of the factory at production levels meeting the predetermined shipping rate; and determining factory capacity analysis for each workstation and process performed therein to evaluate performance of the factory at production capacity levels and identify inefficient workstations that limit production line output.

17. The factory production scheduling and organization process as in claim 16 wherein the step of determining material scheduling analysis comprises the steps of:

determining the batch size of materials needed for each process performed by each workstation to meet the generated material flow rates;

determining the time required to cycle between processes for each workstation;

analyzing the required batch sizes of materials for processes and cycle time for workstations to determine optimal supply characteristics for workstations on the production line to meet the predetermined shipping rate.

18. The factory production scheduling and organization process as in claim 16 wherein the step of determining factory capacity analysis comprises the steps of:

analyzing the processing capacity of each workstation to identify the workstation operating at the highest processing capacity;

revising the material flow rates for each process in each workstation according to the highest processing capacity so as to scale material flow rates through each workstation in the production line to a capacity level;

generating, from the revised material flow rates and effective processing times for each process performed by each workstation, a revised processing capacity for each workstation reflecting processing capacity when the production line is operating at the capacity level;

determining the batch size of materials needed for each process performed by each workstation to meet the revised material flow rates;

determining the time required to cycle between processes for each workstation; and determining the required batch sizes of materials for processes and cycle times for workstations operating at capacity level to identify inefficient workstations and processes and improvement in factory operation.

19. A method for analyzing the scheduling and organization of production for a factory, the method outputting information on optimizing factory production scheduling and organization to meet a predetermined shipping rate, said factory comprised of a plurality of workstations each performing at least one process, comprising the steps of:

receiving factory organization and operation data comprising workstation processing times and workstation set-up times for each process;

modelling the factory according to the input organization and operation data by:

(1) determining the effective processing time for each workstation to process one unit of material according to a given process;

(2) determining the effective set-up time required to configure each workstation to change between each process performed by the workstation;

(3) determining the flow rates of material in and out of each workstation for each process required to output material from the factory meeting the predetermined shipping rate; and (4) determining the production capacity of each workstation to handle material flow rates in and out of each workstation for production of material units at the rate necessary to meet the predetermined shipping rate; and analyzing the production performance and efficiency of the factory by:

(1) evaluating the material flow rates through each workstation for each process cycle time between processes for each workstation to identify optimal material supply requirements for each workstation necessary to meet the predetermined shipping rate;

(2) simulating factory operation at peak capacity levels by scaling material flow rates through each workstation to capacity levels and evaluating the material flow rates and process cycle times at peak capacity levels to identify inefficiently operating workstations and processes to establish improvements in factory organization and operation; and operating the plurality of workstations to implement the established improvements in factory organization and operations on factory production facilities.

20. The production scheduling and organization method as in claim 19 wherein:
the step of determining the effective processing time comprises the step of analyzing the time required by each workstation for each process to meet production of a set number of material units; and
the step of determining the effective set-up time comprises the step of analyzing the time required by each workstation to configure for production of material units.

21. The production scheduling and organization method as in claim 19 wherein the step of calculating production capacity for each workstation comprises the step of analyzing the effective processing times and output flow rates for each workstation and process to evaluate the production capacity of each workstation to process material to meet the calculated flow rate.

22. The production scheduling and organization method as in claim 21 wherein the step of evaluating material flow rates comprises the steps of:
determining the batch size of materials needed for supplying each workstation according to each process performed to meet the calculated flow rates;
determining the cycle time required between processes for each workstation;
analyzing the required batch sizes of materials for processes and cycle times for workstations to schedule the optimal supply of materials to each workstation on the production lien necessary to meet the predetermined shipping rate.

23. The production scheduling the organization method as in claim 21 wherein the step of simulating factory operation at peak capacity levels comprises the steps of:

analyzing the production capacity of each workstation to identify the workstation operating at the highest processing capacity;
revising the material flow rates for each process in each workstation by scaling all workstation material flow rates in accordance with the identified highest production capacity;
adjusting the production capacities for each workstation according to the revised material flow rates to simulate workstation and factory operation at a peak capacity level;
determining batch sizes of materials needed for supplying each workstation to meet the revised flow rates for production at peak capacity;
determining the time required to cycle between processes for each workstation; and
analyzing the required batch sizes of materials and cycle times for production at peak capacity to identify inefficient workstations and processes and improvements in factory operation.

24. A method for improving the performance of a factory having a plurality of workstations performing one or more processes, each process operating on a batch of material, the method comprising the steps of:
determining the batch size of material required by each workstation j to perform each process i;
determining a cycle time ($CT_j$) for each workstation j to process the material;
evaluating the cycle times and batch sizes to identify inefficient workstations and improve the processes performed by each workstation in order to reduce the batch size and cycle time of that workstation; and
operating the processes of the identified inefficient workstations to implement the improvements identified as a result of the evaluation of the cycle times and batch sizes.

* * * * *